United States Patent
Ishihama et al.

(10) Patent No.: US 10,066,037 B2
(45) Date of Patent: *Sep. 4, 2018

(54) ETHYLENE-α-OLEFIN COPOLYMER AND OLEFIN RESIN COMPOSITION

(71) Applicant: JAPAN POLYETHYLENE CORPORATION, Tokyo (JP)

(72) Inventors: Yoshiyuki Ishihama, Mie (JP); Ryotaro Harada, Mie (JP); Masaru Aoki, Mie (JP); Kenji Iiba, Mie (JP); Kazushi Kodama, Kanagawa (JP); Hiroto Hayashi, Kanagawa (JP)

(73) Assignee: JAPAN POLYETHYLENE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/128,212

(22) PCT Filed: Mar. 31, 2015

(86) PCT No.: PCT/JP2015/060196
§ 371 (c)(1),
(2) Date: Sep. 22, 2016

(87) PCT Pub. No.: WO2015/152267
PCT Pub. Date: Aug. 10, 2015

(65) Prior Publication Data
US 2017/0101491 A1    Apr. 13, 2017

(30) Foreign Application Priority Data

Mar. 31, 2014  (JP) ................................. 2014-073308

(51) Int. Cl.
*C08F 210/16*    (2006.01)
*C08J 5/18*    (2006.01)
*C08L 23/08*    (2006.01)
*C08F 4/659*    (2006.01)

(52) U.S. Cl.
CPC .............. *C08F 210/16* (2013.01); *C08J 5/18* (2013.01); *C08L 23/0815* (2013.01); *C08F 4/65912* (2013.01); *C08F 4/65916* (2013.01); *C08J 2323/08* (2013.01); *C08L 2205/025* (2013.01)

(58) Field of Classification Search
CPC .. C08F 210/16; C08F 4/65927; C08F 210/14; C08F 4/65912; C08F 4/65916; C08J 5/18; C08J 2323/08; C08L 23/0815; C08L 2205/025

See application file for complete search history.

(56) References Cited

U.S. PATENT DOCUMENTS

| | | | |
|---|---|---|---|
| 6,242,545 B1 | 6/2001 | Jejelowo et al. | |
| 2003/0055176 A1 | 3/2003 | Jacobsen et al. | |
| 2004/0249101 A1 | 12/2004 | Iseki et al. | |
| 2006/0135712 A1 | 6/2006 | Satoh et al. | |
| 2007/0093627 A1 | 4/2007 | Iseki et al. | |
| 2014/0194277 A1* | 7/2014 | Ishihama et al. | C08F 10/02 502/117 |
| 2016/0244544 A1 | 8/2016 | Ishihama et al. | |
| 2017/0114165 A1* | 4/2017 | Ishihama et al. | C08F 210/16 |

FOREIGN PATENT DOCUMENTS

| | | |
|---|---|---|
| JP | H09-031260 A | 2/1997 |
| JP | H11246714 A1 | 9/1999 |
| JP | 2004-217924 A | 8/2004 |
| JP | 2004-292772 A | 10/2004 |
| JP | 2005-120385 A | 5/2005 |
| JP | 2005-206777 A | 8/2005 |
| JP | 2007-119716 A | 5/2007 |
| JP | 2007-308718 A | 11/2007 |
| JP | 2010-31270 A | 2/2010 |
| JP | 2011-137146 A | 7/2011 |
| JP | 2012-214781 A | 11/2012 |
| JP | 2013-227271 A | 11/2013 |
| JP | 2013-227482 A | 11/2013 |
| JP | 2014-70029 A | 4/2014 |
| JP | 2015-63515 A | 4/2015 |
| JP | 2015-83631 A | 4/2015 |
| WO | 2012/133717 A1 | 10/2012 |

OTHER PUBLICATIONS

International Search Report issued with respect to Application No. PCT/JP2015/060196, dated Jun. 16, 2015.
International Preliminary Report on Patentability issued with respect to Application No. PCT/JP2015/060196, dated Oct. 4, 2016.

\* cited by examiner

*Primary Examiner* — Nathan M Nutter
(74) *Attorney, Agent, or Firm* — Greenblum & Bernstein, P.L.C.

(57) ABSTRACT

[Problem] To provide an ethylene-α-olefin copolymer that is highly effective in improving the molding properties of polyolefin resins and at the same time highly effective improving the balance between impact strength and stiffness.
[Solution] Provided is an ethylene-α-olefin copolymer having a specific MFR, a specific density, and a specific molecular weight distribution, containing a suitable amount of a long-chain branching structure characterized by a branching index, and having a specific composition distribution structure characterized by solvent fractionation behavior.

19 Claims, 5 Drawing Sheets

[Fig. 1]
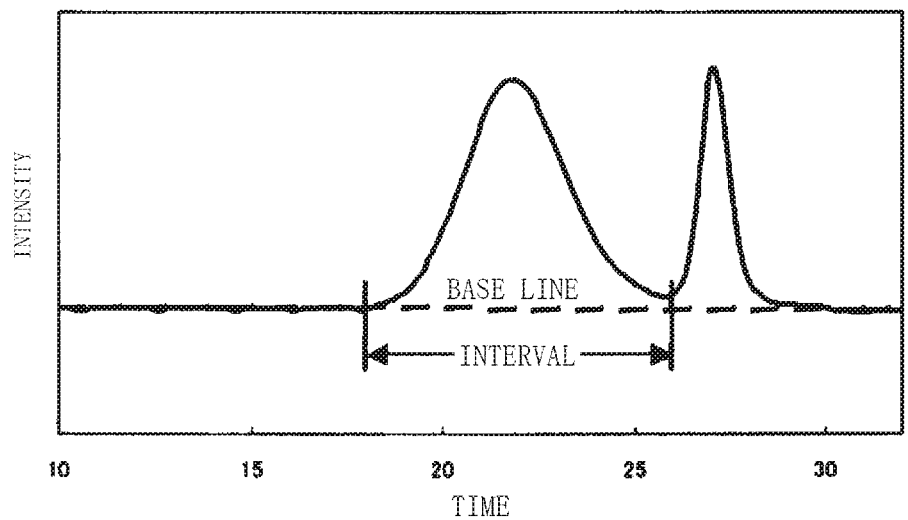
[Fig. 2]
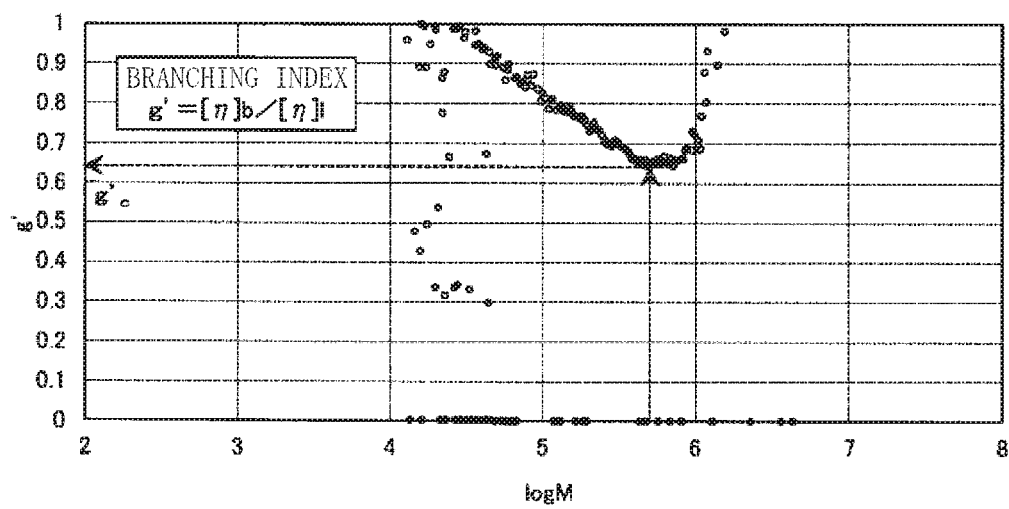

[Fig. 3]
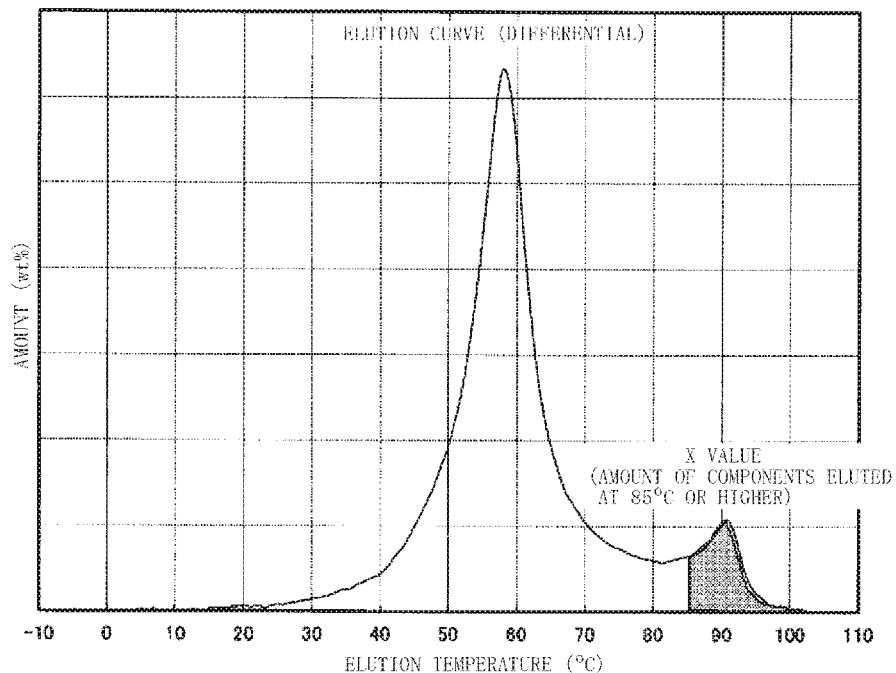

[Fig. 4]
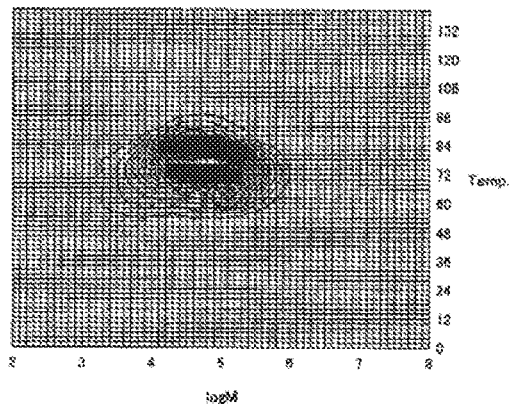
COPOLYMER OF EXAMPLE 4
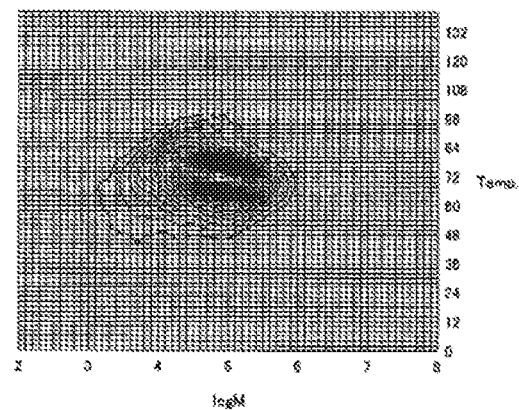
COPOLYMER OF EXAMPLE 6
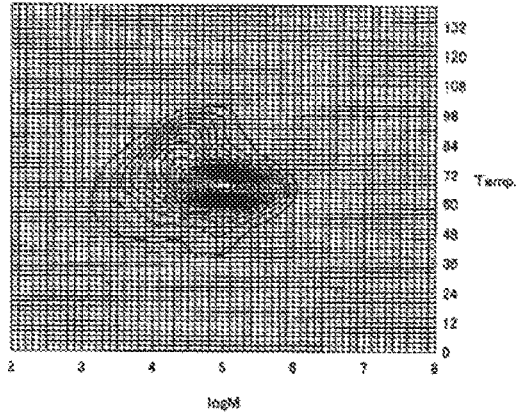
COPOLYMER OF COMPARATIVE EXAMPLE 1
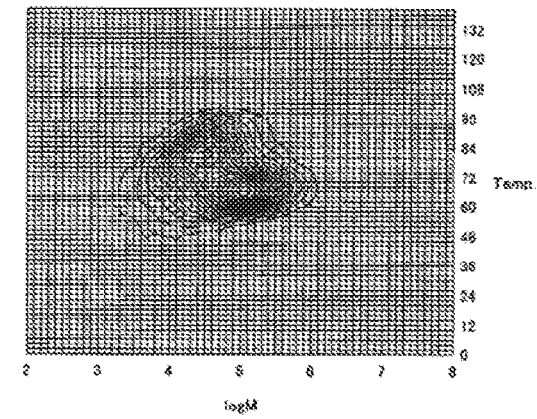
COPOLYMER OF COMPARATIVE EXAMPLE 2

[Fig. 5]
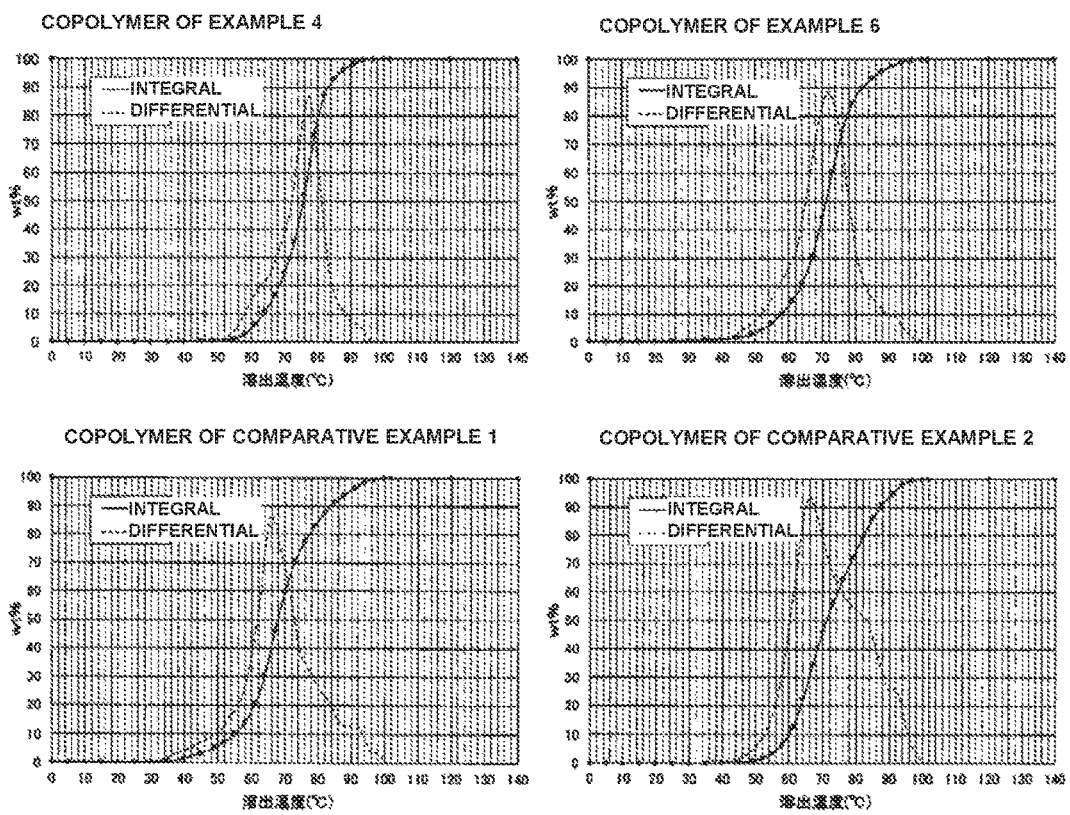
[Fig. 6]
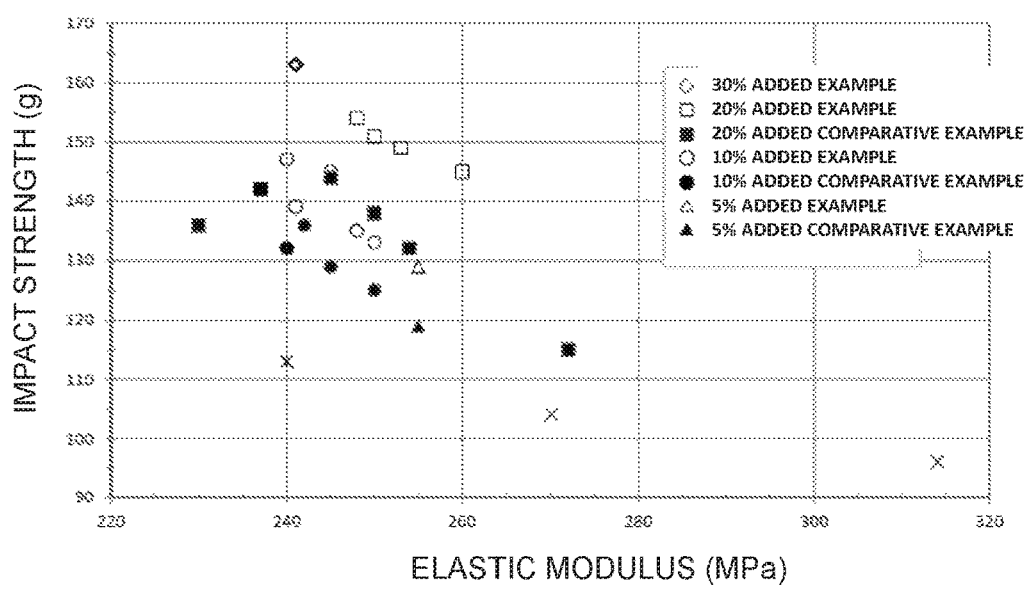

[Fig. 7]
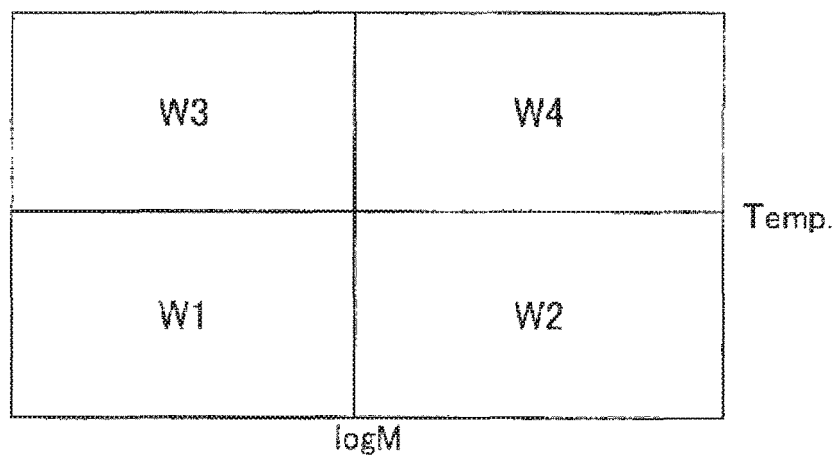

ETHYLENE-α-OLEFIN COPOLYMER AND OLEFIN RESIN COMPOSITION

TECHNICAL FIELD

The present invention relates to a novel ethylene-α-olefin copolymer and a novel olefin resin composition. More specifically, the present invention relates to an ethylene-α-olefin copolymer that is for use in modifying polyolefin resins and has a high ability to improve the moldability of a polyolefin resin and to adequately improve the balance between the impact strength and stiffness of the resin when blended with the resin, and the present invention also relates to an olefin resin composition containing such an ethylene-α-olefin copolymer.

BACKGROUND ART

In recent years, plastic films, sheets, injection-molded products, pipes, extrusion-molded products, and blow-molded products are increasingly used in various industrial fields. In particular, polyolefin resins (olefin polymers) are widely used because of low cost and light weight, a high level of moldability, stiffness, impact strength, transparency, chemical resistance, and recyclability, and other reasons. In general, polyolefin resins are subjected to molding while kept in a melted state. In many cases, however, olefin homopolymers have insufficient melt properties such as insufficient fluidity and elongational viscosity, have difficulty in maintaining sufficient moldability, or have an insufficient level of solid state properties such as transparency and stiffness.

Among polyethylene resins, linear low density polyethylene (L-LDPE) obtained by catalytic polymerization of ethylene and α-olefin is known as a high-strength resin. However, it is difficult to provide reliable moldability for L-LDPE alone, and L-LDPE has disadvantages such as low transparency and stiffness. As a measure to compensate for these disadvantages, high-pressure process low-density polyethylene (HPLD) with high moldability or an olefin polymer as a modifier with a different molecular weight or a different density has been blended to improve the melt properties or the solid state properties.

Unfortunately, the use of HPLD as a modifier can cause a problem such as a reduction in impact strength although it can improve moldability, and the use of an olefin polymer with a different molecular weight or density can cause a problem such as insufficient moldability or degradation of transparency due to a widened distribution of molecular weight or copolymer composition.

The current enforcement of the Law for the Promotion of Sorted Collection and Recycling of Containers and Packages and the current trend toward resource conservation require a reduction in the consumption of raw material resins. From this point of view, there is an increasing demand for a reduction in the thickness of molded products. This demand requires an improvement of impact strength and stiffness (elastic modulus).

Reduction of the density of ethylene polymers is a well-known method for improving impact strength. However, this method can also reduce the stiffness (or make the polymers soft) and thus is not preferred. Attempts for the thickness reduction include, for example, the use of a combination of two specific ethylene-α-olefin copolymers with different densities and the use of a three-component blend composition containing a specific HPLD for improving moldability and transparency (see Patent Literature 1).

These methods can produce polyethylene resin compositions with high transparency and a good balance between impact strength and stiffness as compared with those of traditional compositions. In these methods, however, a reduction in impact strength is inevitably associated with the HPLD blending, and the blending of three ethylene polymers is considered to be economically disadvantageous in terms of stable supply of constant-quality products at an industrial level as compared with transitional methods.

In recent years, it has been reported that polyolefin resin-modifying ethylene polymers for improving moldability and resin strength at the same time are developed by utilizing a polymerization designing technique with a metallocene catalyst that allows a long-chain branching structure to be formed in ethylene polymers. Examples of such a technique include a technique in which an ethylene polymer containing long-chain branches exhibiting specific elongational viscosity behavior is used as a modifier and blended with the target polyolefin resin (see Patent Literature 2), a technique in which a low-density ethylene-propylene copolymer having a long-chain branching structure defined by a specific polymer molecular structure index and a specific intrinsic viscosity ratio is used as a modifier to form a resin composition (see Patent Literature 3), and a technique in which long-chain branching polyethylene with a wide molecular weight distribution exhibiting high flow activation energy is used as a modifier (see Patent Literature 4). These techniques can prevent a significant reduction in the impact strength of polyolefin resins, which would otherwise be caused by traditional modification with HPLD, but are still not able to prevent a reduction in strength or transparency and still at an insufficient improvement level because of insufficient design of the long chain branching ethylene polymer.

Under these circumstances, there has been continued development of a modifying ethylene polymer that can solve the problems with conventional modifying ethylene polymers and provide high moldability, a good balance between impact strength and stiffness, and high transparency, and there have been continued studies on a metallocene polymerization catalyst that is useful for the development of an ethylene polymer with such properties and capable of controlling a long-chain branching structure (see Patent Literatures 5 to 8). Among them, a transition metal catalyst comprising a specific cyclopentadienyl compound, which has been recently found by the inventor et al., is proposed as a highly active catalyst for ethylene-α-olefin copolymers with preferred long-chain branching (Patent Literature 8).

CITATION LIST

Patent Literatures

Patent Literature 1: JP 2010-031270 A
Patent Literature 2: JP 2012-214781 A
Patent Literature 3: JP 09-031260 A
Patent Literature 4: JP 2007-119716 A
Patent Literature 5: JP 2004-217924 A
Patent Literature 6: JP 2004-292772 A
Patent Literature 7: JP 2005-206777 A
Patent Literature 8: JP 2013-227271 A.

SUMMARY OF INVENTION

Technical Problem

In view of the above problems with the conventional art, an object of the present invention is to provide an ethylene- α-olefin copolymer that is highly effective in improving the molding properties of polyolefin resins and at the same time highly effective in adequately improving the balance between impact strength and stiffness, and to provide an olefin resin composition containing such an ethylene-α-olefin copolymer.

Solution to Problem

As a result of intensive studies to achieve the object, the inventors have accomplished the present invention based on the finding that an ethylene-α-olefin copolymer having a specific long-chain branching index, a relatively narrow reverse comonomer composition distribution index, a specific MFR, and a specific density is highly effective, particularly as resin-modifying polyethylene, in improving the balance between impact strength and stiffness. The inventors also have found that controlled polymerization under specific conditions using a specific catalyst developed by the applicant recently makes it possible to efficiently obtain the ethylene-α-olefin copolymer having a desired level of long-chain branching index and composition distribution index.

Specifically, a first aspect of the present invention provides an ethylene-α-olefin copolymer satisfying the following conditions (1), (2), (5), (7), and (9):

(1) the copolymer has a MFR of more than 0.1 g/10 minutes but not more than 10 g/10 minutes;

(2) the copolymer has a density of 0.895 to 0.940 g/cm$^3$;

(5) the copolymer has a minimum branching index (gc) of 0.40 to 0.85 as measured for branching index g' in the molecular weight range of 100,000 to 1,000,000 width a GPC measurement system comprising a combination of a differential refractometer, a viscosity detector, and a light scattering detector;

(7) the copolymer has a sum ($W_2+W_3$) of a content ($W_2$) and a content ($W_3$) of more than 40% by weight but less than 56% by weight, wherein $W_2$ is a content of components with molecular weights equal to or more than a weight average molecular weight in components eluted at temperatures equal to or lower than a temperature where an eluted amount determined from an integral elution curve measured by cross fractionation chromatography (CFC) is 50 wt %, and $W_3$ is a content of components with molecular weights less than the weight average molecular weight in components eluted at temperatures higher than the temperature where the eluted amount determined from the integral elution curve, is 50 wt %; and (9) a difference ($W_2-W_4$) between $W_2$ and $W_4$ is more than 0% by weight but less than 20% by weight.

A second aspect of the present invention provides an ethylene-α-olefin copolymer according to the first aspect of the present invention and further satisfying the following condition. (1'):

(1') the copolymer has a MFR of more than 0.1 g/10 minutes but not more than 1.0 g/10 minutes.

A third aspect of the present invention provides an ethylene-α-olefin copolymer according to the first or second aspect of the present invention and further satisfying the following condition (2'):

(2') the copolymer has a density of not less than 0.898 g/cm$^3$ but less than 0.934 g/cm$^3$.

A fourth aspect of the present invention provides an ethylene-α-olefin copolymer according to any one of the first to third aspects of the present invention in which the α-olefin has three to ten carbon atoms.

A fifth aspect of the present invention provides an ethylene-α-olefin copolymer according to any one of the first to fourth aspects of the present invention and further satisfying the following condition (3):

(3) the copolymer has a molecular weight distribution Mw/Mn of 3.0 to 5.5 as measured by gel permeation chromatography (GPC).

A sixth aspect of the present invention provides an ethylene-α-olefin copolymer according to any one of the first to fifth aspects of the present invention and further satisfying the following condition (4):

(4) the copolymer has a molecular weight distribution Mz/Mw of 2.0 to 6.0 as measured by GPC.

A seventh aspect of the present invention provides an ethylene-α-olefin copolymer according to any one of the first to sixth aspect of the present invention and further satisfying the following condition (6):

(6) a content (X) of components eluted at 85° C. or higher by temperature rising elution fractionation (TREF) is 2 to 15% by weight.

An eighth aspect of the present invention provides an ethylene-α-olefin copolymer according to any one of the first to seventh aspects of the present invention and further satisfying the following condition (8):

(8) the copolymer has a sum ($W_2+W_4$) of $W_2$ and $W_4$ of more than 25% by weight but less than 50% by weight.

A ninth aspect of the present invention provides a method for producing the ethylene-α-olefin copolymer according to any one of the first to eighth aspects of the present invention, the method comprising producing the ethylene-α-olefin copolymer using an olefin polymerization catalyst comprising the following components (A), (B) and (C):

(A) a bridged cyclopentadienyl indenyl compound containing a transition metal element;

(B) a compound capable of reacting with the compound of the component (A) to form a cationic metallocene compound; and (C) an inorganic compound carrier.

A tenth aspect of the present invention provides a method according to the ninth aspect of the present invention for producing the ethylene-α-olefin copolymer, wherein the ratio of number of moles of a metal in the component (B) to 1 g of the component (C) is more than 0.006 (moles/g) to 0.020 (moles/g).

An eleventh aspect of the present invention provides a method for producing the ethylene-α-olefin copolymer according to any one of the first to eighth aspects of the present invention, the method comprising copolymerizing ethylene and an α-olefin by a gas phase method or a slurry method.

A twelfth aspect of the present invention provides an olefin resin composition comprising: the ethylene-α-olefin copolymer according to any one of the first to eighth aspects of the present invention; and one or more other olefin resins.

A thirteenth aspect of the present invention provides an olefin resin composition according to the twelfth aspect of the present invention, wherein an amount of the ethylene-α-olefin copolymer contained in the resin composition is 1 to 59% by weight.

A fourteenth aspect of the present invention provides an olefin resin composition according to the twelfth or thirteenth aspect of the present invention which comprises an additional ethylene-α-olefin copolymer (B) other than the copolymer (A) as an olefin resin other than the copolymer (A).

A fifteenth aspect of the present invention provides an olefin resin composition according to the fourteenth aspect of the present invention, wherein the additional ethylene-α-olefin copolymer (B) satisfies the following conditions (B-1) and (B-2):

(B-1) the copolymer (B) has a MFR of 0.01 to 20 g/10 minutes; and (B-2) the copolymer (B) has a density of 0.880 to 0.970 g/cm$^3$.

A sixteenth aspect of the present invention provides an olefin resin composition according to the fifteenth aspect of the present invention, wherein the additional ethylene-α-olefin copolymer (B) further satisfies the following condition (B-3):

(B-3) the copolymer (B) has a molecular weight distribution Mw/Mn of 2.0 to 4.0 as measured by gel permeation chromatography (GPC).

An seventeenth aspect of the present invention provides an olefin resin composition according to any one of the twelfth to sixteenth aspects of the present invention, wherein the ethylene-α-olefin copolymer (A) and the ethylene-olefin copolymer (B) satisfy at least one of the following conditions (AB-1) MFR$_B$>MFR$_A$; and (AB-2) [Mw/Mn]$_B$<[Mw/Mn]$_A$, wherein MFR$_A$ represents MFR of the ethylene-α-olefin copolymer (A), [Mw/Mn]$_A$ represents the molecular weight distribution MW/Mn of the ethylene-α-olefin copolymer (A) measured by gel permeation chromatography (GPC), MFR$_B$ represents MFR of the ethylene-α-olefin copolymer (B), and [Mw/Mn]$_B$ represents the molecular weight distribution Mw/Mn of the ethylene-α-olefin copolymer (B) measured by gel permeation chromatography (GPC).

An eighteenth aspect of the present invention provides an olefin resin composition according to any one of the twelfth to seventeenth aspects of the present invention, wherein the ethylene-α-olefin copolymer (B) is a linear low density polyethylene having a MFR of not less than 0.1 to less than 5.0 and produced with a Ziegler catalyst or metallocene polyethylene having a MFR of 0.1 to 10 and produced with a metallocene catalyst.

A nineteenth aspect of the present invention provides film obtained from the ethylene-α-copolymer according to any one of the first to eighth aspects of the present invention or the resin composition according to any one of the twelfth to eighteenth aspects of the present invention.

Advantageous Effects of Invention

The ethylene-α-olefin copolymer of the present invention is highly effective, as a modifier for polyolefin resins, in improving molding properties and at the same time highly effective in adequately improving the balance between impact strength and stiffness. The polyolefin resin modified with the ethylene-α-olefin copolymer of the present invention is expected to allow constant-quality products with a good balance between impact strength and stiffness to be supplied stably at an industrial level.

BRIEF DESCRIPTION OF DRAWINGS

FIG. 1 is a graph showing a base line and an interval with respect to a chromatogram for use in gel permeation chromatography (GPC).

FIG. 2 is a graph showing a molecular weight distribution curve calculated from GPC-VIS measurement (branching structure analysis) and the relationship between branching index (g') and molecular weight (M).

FIG. 3 is a graph showing an elution temperature distribution obtained by temperature rising elution fractionation (TREF).

FIG. 4 is a graph showing, as a contour map, eluted amounts with respect to elution temperature and molecular weight measured by cross fractionation chromatography (CFC).

FIG. 5 is a graph showing the relationship between elution temperature and elution content (wt %) at each elution temperature measured by cross fractionation chromatography (CFC).

FIG. 6 is a graph showing the relationship between the elastic modulus and impact strength of films produced using bends with the copolymers of examples according to the present invention and blends with the copolymers of comparative examples, respectively.

FIG. 7 is a schematic diagram about $W_1$ to $W_4$. In the drawing, the abscissa axis represents the logarithm (log M) of molecular weight while the abscissa axis represents elution temperature (Temp.).

DESCRIPTION OF EMBODIMENTS

The present invention is directed to an ethylene-α-olefin copolymer having a specific long-chain branching index, a relatively narrow reverse comonomer composition distribution index, a specific MFR, and a specific density and being suitable as a modifier for polyolefin resin. Hereinafter, the ethylene-α-olefin copolymer of the present invention, specifically conditions (1) to (9) featuring the ethylene-α-olefin copolymer, and the method for producing the ethylene-α-olefin copolymer (specifically, each component of a polymerization catalyst for use in the production method, the method for preparing the catalyst, and the polymerization method) will be described in detail item by item.

1. Ethylene-α-olefin Copolymer of the Present Invention.

The ethylene-α-olefin copolymer of the present invention satisfies all of conditions (1), (2), (5), (7), and (9) described below. Specifically, the ethylene-α-olefin copolymer of the present invention has a new feature in that it has a specific level of MFR and density (conditions 1 and 2), long-chain branching in a suitable range (condition 5), and a relatively narrow reverse comonomer composition distribution with an appropriate content of low-density, high-molecular-weight components (conditions 7 and 9).

Many conventional ethylene-α-olefin copolymers usually obtained by catalytic polymerization have what is called a normal comonomer composition distribution (reverse comonomer composition distribution). Although there have been some reports showing that ethylene-α-olefin copolymers with what is called a reverse comonomer composition distribution are obtained using a certain catalytic species, most of such copolymers have no long-chain branching structure. According to the present invention, the ethylene-α-olefin copolymer having a suitable degree of long-chain branching structure and a relatively narrow reverse comonomer composition distribution with a suitable content of low-density, high-molecular-weight components is highly effective particularly in improving molding properties and at the same time highly effective in improving the balance between impact strength and stiffness. Such advantageous effects have not been found before. The present invention is also based on the finding that the ethylene-α-olefin copolymer with such features can be advantageously produced using a specific catalyst species developed recently, which is illustrated later in the section about the method for producing the ethylene-α-olefin copolymer of the present invention.

1-1. Condition (1)

The ethylene-α-olefin copolymer of the present invention has a melt flow rate (MFR) of more than 0.1 g/10 minutes but not more than 10 g/10 minutes, preferably more than 0.1 g/10 minutes but not more than 1.0 g/10 minutes, more preferably more than 0.1 g/10 minutes but not more than 0.5 g/10 minutes, even more preferably more than 0.1 g/10 minutes but not more than 0.4 g/10 minutes.

The ethylene-α-olefin copolymer with a MFR in this range is highly effective in improving moldability and the balance between impact strength and stiffness when blended with polyolefin resins. On the other hand, an ethylene-α-olefin copolymer with a MFR of 0.1 g/10 minutes or less is not preferred in view of moldability and other properties in some cases, and an ethylene-α-olefin copolymer with a MFR of more than 10 g/10 minutes is less likely to be sufficiently effective in improving impact strength or stiffness and thus is not preferred. In the present invention, the MFR of the ethylene-α-olefin copolymer refers to the value measured under the conditions of 190° C. and a load of 21.18 N (2.16 kg) according to "Plastics—Testing method for the melt mass-flow rate (MFR) and melt volume-flow rate (MVR) of thermoplastics" in JIS K 7210.

1-2. Condition (2)

The ethylene-α-olefin copolymer of the present invention has a density of 0.895 g/cm$^3$ to 0.940 g/cm$^3$, preferably 0.898 or more and less than 0.934 g/cm$^3$, more preferably 0.900 to 0.930 g/cm$^3$, even more preferably 0.910 to 0.930 g/cm$^3$, further more preferably 0.915 to 0.925 g/cm$^3$.

The ethylene-α-olefin copolymer with a density in this range is highly effective in improving the balance between impact strength and stiffness when blended with the polyolefin resin to be modified. On the other hand, an ethylene-α-olefin copolymer with a density of less than 0.895 g/cm$^3$ is not preferred in view of stiffness in some cases, and an ethylene-α-olefin copolymer with a density of more than 0.940 g/cm$^3$ is not sufficiently effective in improving impact strength or other properties and thus is not preferred.

In the present invention, the density of the ethylene-α-olefin copolymer refers to the value measured by the method described below.

Pellets were subjected to hot pressing to form a pressed sheet with a thickness of 2 mm. The sheet was placed in a 1,000-ml volume beaker, which was filled with distilled water, then covered with a watch glass, and subjected to heating with a mantle heater. After the distilled water was boiled for 60 minutes from the start of boiling, the beaker was placed on a wooden board and allowed, to cool. In this process, the volume of the boiled distilled water after the 60-minute boiling was 500 ml, and the time taken for the boiled water to cool to room temperature was controlled not to be 60 minutes or less. The test sheet was immersed in water almost at the center so that it was not in contact with the beaker or the water surface. The sheet was annealed for 16 to 24 hours under the conditions of 23° C. and a humidity of 50% and then stamped into 2 mm long, 2 mm wide pieces, which were subjected to measurement at a test temperature of 23° C. according to "Plastics—Methods of determining the density and specific gravity of non-cellular plastics" in JIS K 7112.

1-3. Condition (5)

In addition to conditions (1) and (2) above, the ethylene-α-olefin copolymer of the present invention has a minimum branching index (gc) of 0.40 to 0.85, preferably 0.45 to 0.85 or 0.50 to 0.85, more preferably 0.50 to 0.77, even more preferably 0.51 to 0.75 as measured for branching index gc in the molecular weight range of 100,000 to 1,000,000 with a GPC measurement system comprising a combination of a differential refractometer, a viscosity detector, and a light scattering detector. An ethylene-α-olefin copolymer with a $g_c$ value of more than 0.85 is not preferred because it is not sufficiently effective in improving moldability when blended with polyolefin resins. An ethylene-α-olefin copolymer with a $g_c$ value of less 0.40 is not preferred because it can reduce the impact strength or transparency of polyolefin resins although it can improve the moldability the polyolefin resins.

In the present invention, the $g_c$ value of the ethylene-α-olefin copolymer is a physical property value indicating the degree of growth of long-chain branches introduced into the copolymer. A greater $g_c$ value indicates a smaller amount of long-chain branches, and a smaller $g_c$ value indicates a larger amount of introduced long-chain branches. The $g_c$ value can be generally controlled by selecting the catalyst used for the polymerization. The $g_c$ value of the ethylene-α-olefin copolymer is a measure for evaluating the amount of long-chain branches using the branching index (g') and the molecular weight distribution curve calculated from the GPC-VIS measurement described below.

[Analysis of Branching Structure by GPC-VIS]

Alliance GPCV 2000 from Waters was used as a GPC system equipped with a differential refractometer (RI) and a viscosity detector (viscometer). A multiangle laser light scattering detector (MALLS) DAWN-E from Wyatt Technology was used as a light scattering detector. The detectors were connected in the following order: MALLS, RI, and Viscometer. The mobile phase solvent was 1,2,4-trichlorobenzene (to which an antioxidant Irganox 1076 was added at a concentration of 0.5 mg/mL). The flow rate was 1 mL/minute. Two GMHHR-H (S) HT columns from Tosoh Corporation were connected and used.

The temperature of the columns, the sample injection port, and each detector was 140° C. The sample concentration was 1 mg/mL. The injection volume (sample loop volume) was 0.2175 mL. The absolute molecular weight (M) and the square radius of gyration (Rg), which were obtained from the MALLS, and the intrinsic viscosity ([η]), which was obtained from the viscometer, were calculated with reference to the literatures below using data processing software ASTRA (version 4.73.04) included with the MALLS.

REFERENCE LITERATURES

1. Developments in polymer characterization, vol. 4. Essex: Applied Science; 1984. Chapter 1.
2. Polymer, 45, 6495-6505 (2004)
3. Macromolecules, 33, 2424-2436 (2000)
4. Macromolecules, 33, 6945-6952 (2000)

[Calculation of Branching Index ($g_c$) and Other Values]

The branching index (g') is calculated as the ratio (ηbranch/ηlin) of the intrinsic viscosity (ηbranch) obtained by measuring the sample with the viscometer to the intrinsic viscosity (ηlin) obtained by measuring a linear polymer separately.

A polymer molecule with introduced long-chain branches has a radius of gyration smaller than that of a linear polymer molecule of the same molecular weight. The intrinsic viscosity decreases with decreasing radius of gyration. Therefore, as long-chain branches are introduced, the ratio (ηbranch/ηlin) of the intrinsic viscosity (ηbranch) of the branched polymer to the intrinsic viscosity (ηlin) of a linear polymer of the same molecular weight decreases. Therefore, a branching index (q'=ηbranch/ηlin) of less than 1 means that the polymer has introduced branches, and a smaller branching index means a larger amount of introduced long-chain branches. Specifically, in the present invention, the minimum g' value in the molecular weight range of 100,000 to 1,000,000 with respect to the absolute molecular weight obtained from the MALLS is calculated as the $g_c$ value. FIG. 2 shows exemplary results of the GPC-VIS analysis. The molecular weight distribution curve determined based on the molecular weight (M) obtained from the MALLS and the concentration obtained from the RI is shown on the left of FIG. 2, while the branching index (g') at the molecular weight (M) is shown on the right of FIG. 2. In this case, Linear Polyethylene Standard Reference Material 1475a (National Institute of Standards & Technology) was used as the linear polymer.

1-4. Condition (7)

In addition to conditions (1), (2), and (5) above, the ethylene-α-olefin copolymer of the present invention has a sum ($W_2+W_3$) of a content ($W_2$) and a content ($W_3$) of more than 40% by weight but less than 56% by weight, wherein $W_2$ is a content of components with molecular weights equal to or more than the weight average molecular weight in the components eluted at temperatures equal to or lower than the temperature where the eluted amount determined from the integral elution curve measured by cross fractionation chromatography (CFC) is 50 wt % and $W_3$ is a content of components with molecular weights less than the weight average molecular weight in the components eluted at temperatures higher than the temperature where the eluted amount determined from the integral elution curve is 50 wt %. The sum ($W_2+W_3$) is preferably more than 41% by weight but less than 56% by weight, more preferably more than 43% by weight to less than 56% by weight, even more preferably more than 45% by weight but less than 56% by weight.

The values $W_1$ and so on obtained from the integral elution curve measured by cross fractionation chromatography (CFC) are measures used to indicate the "comonomer composition distribution," which indicates the distribution of all the comonomer amounts and molecular weights of individual polymers in the whole copolymer. Specifically, the values indicate the content ($W_1$) of polymers with a relatively large amount of the comonomer and with relatively low molecular weights, the content ($W_2$) of polymers with a relatively large amount of the comonomer and with relatively high molecular weights, the content ($W_3$) of polymers with a relatively small amount of the comonomer and with relatively low molecular weights, and the content ($W_4$) of polymers with a relatively small amount of the comonomer and with relatively high molecular weights, in the whole copolymer. FIG. 7 is a schematic diagram showing $W_1$ to $W_4$.

Conventional ethylene-α-olefin copolymers obtained by common catalytic polymerization have what is called a normal comonomer composition, in which specifically, $W_1+W_4$ is often at least 60% by weight and $W_2+W_3$ is often at most 40% by weight. In contrast, one of the features of the ethylene-α-olefin copolymer obtained as a preferred example of the present invention using the specific catalyst shown in Example 1 herein is that the copolymer has what is called a reverse comonomer composition, in which specifically, $W_2+W_3$ is more than 40% by weight but less than 56% by weight.

If the $W_2+W_3$ value is 40% by weight or less, the ethylene-α-olefin copolymer can have a reduced content of low-density, high-molecular-weight components, which effectively act to improve the impact strength of polyolefin resins, or have a reduced content of high-density, low-density components, which effectively act to improve the stiffness of polyolefin resins, so that a larger amount of the ethylene-α-olefin copolymer will need to be blended in order to produce the physical property-improving effect, which is not economical and thus not preferred. On the other hand, if the $W_2+W_3$ value is 56% by weight or more, the contents of the high-density, low-molecular-weight components and the low-density, high-molecular-weight components in the ethylene-α-olefin copolymer can be unbalanced, so that the effect of improving the physical properties of polyolefin resins will not be produced as expected or the high-density, low-molecular-weight components and the low-density, high-molecular-weight components can have poor dispersibility, which can cause degradation of transparency or gelation and thus is not preferred.

[CFC Measurement Conditions]

A cross fractionation chromatograph (CFC) includes a temperature rising elution fractionation (TREF) part, in which crystallizability fractionation is performed, and a gel permeation chromatography (GPC) part, in which molecular weight fractionation is performed.

The analysis using the CFC may be performed as follows.

First, a polymer sample is completely dissolved at 140° C. in o-dichlorobenzene (ODCB) containing 0.5 mg/mL of BHT. The sample solution is then injected through the sample loop of the chromatograph into its TREF column (a column packed inactive glass bead carriers) held at 140° C. The solution is gradually, cooled to a predetermined first elution temperature so that the polymer sample is crystallized. After the sample is held at the predetermined temperature for 30 minutes, ODCB is allowed to pass through the TREF column so that the eluted component is injected into the GPC part to undergo molecular weight fractionation, in which a chromatogram is obtained with an infrared detector (MIRAN 1A IR Detector manufactured by FOXBORO, measurement wavelength 3.42 μm). During this process, the temperature of the TREF part is raised to the next elution temperature, so that the component eluted at a second elution temperature is injected into the GPC part after the chromatogram at the first elution temperature is obtained. Thereafter, the same operation repeated to obtain the chromatogram of the component eluted at each elution temperature.

The CFC measurement conditions are as follows.

Chromatograph: CFC-T102 L manufactured by Dia Instruments Co., Ltd.

GPC columns: AD-806MS (three columns connected in series) manufactured by Showa Denko K.K.

Solvent: ODCB

Sample concentration: 3 mg/mL

Injection volume: 0.4 mL

Crystallization rate: 1° C./minute

Solvent flow rate: 1 mL/minute

GPC measurement time: 34 minutes

Stabilization time after GPC measurement: 5 minutes

Elution temperatures: 0, 5, 10, 15, 20, 25, 30, 35, 40, 45, 49, 52, 55, 58, 61, 64, 67, 70, 73, 76, 79, 82, 85, 88, 91, 94, 97, 100, 102, 120, 140

[Data Analysis]

The chromatogram (obtained by the measurement) of the components eluted at the respective elution temperatures is used to calculate the normalized eluted amounts (proportional to the areas in the chromatogram), the sum of which is 100%.

An integral elution curve against elution temperature is further calculated as shown in FIG. 5. The integral elution curve is then differentiated by temperature to calculate a differential elution curve.

The molecular weight distribution is also calculated from the respective chromatograms by the procedure described below. The retention volume is converted to the molecular weight using a calibration curve prepared in advance with polystyrene standards. All the polystyrene standards used are the following products manufactured by Tosoh Corporation. F380, F288, F128, F80, F40, F20, F10, F4, F1, A5000, A2500, A1000.

The calibration curve is prepared using a solution of 0.3 mg/mL of each standard in ODCB (containing 0.5 mg/mL of BHT), which is injected in a volume of 0.4 mL.

A cubic equation obtained by least squares approximation is used for the calibration curve.

The conversion to the molecular weight is performed using a general-purpose calibration curve with reference to Sadao Mori, "Size Haijo Chromatography" (Size Exclusion Chromatography), Kyoritsu Shuppan Co., Ltd. In this process, the following values are used in the viscosity formula $[\eta]=K \times W^{\alpha}$.

PS: $K=1.38 \times 10^{-4}$, $\alpha=0.7$
PE: $K=3.92 \times 10^{-4}$, $\alpha=0.733$ In some cases, the peak of BHT added to the solvent overlaps with the low-molecular-weight side of the peak of the eluted component in the chromatogram at the first elution temperature. In such cases, a base line is drawn as shown in FIG. 1 to define the interval in which the molecular weight distribution is to be determined.

In addition, as shown in Table 1 below, the whole weight average molecular weight is calculated from the elution contents (wt % in the table) and the weight average molecular weights (Mw in the table) at the respective elution temperatures.

TABLE 1

Example of commercially available high-pressure radical process low-density polyethylene

| Elution temperature | wt % | Mn | Mw | Mz | Mw/Mn | Mz/Mw |
|---|---|---|---|---|---|---|
| 0 | 0.59 | 759 | 927 | 1,128 | 1.22 | 1.22 |
| 5 | 0.04 | 661 | 863 | 1,104 | 1.31 | 1.28 |
| 10 | 0.10 | 1,131 | 1,392 | 1,642 | 1.23 | 1.18 |
| 15 | 0.25 | 791 | 1,613 | 2,412 | 2.04 | 1.50 |
| 20 | 0.15 | 1,654 | 1,904 | 2,218 | 1.15 | 1.16 |
| 25 | 0.21 | 1,838 | 2,493 | 3,157 | 1.36 | 1.27 |
| 30 | 0.28 | 1,114 | 1,893 | 2,703 | 1.70 | 1.43 |
| 35 | 0.49 | 2,446 | 3,240 | 4,163 | 1.32 | 1.28 |
| 40 | 1.12 | 2,581 | 4,494 | 7,000 | 1.74 | 1.56 |
| 45 | 0.89 | 3,479 | 4,420 | 5,459 | 1.27 | 1.24 |
| 49 | 1.15 | 3,220 | 4,887 | 6,339 | 1.52 | 1.30 |
| 52 | 1.13 | 4,718 | 6,625 | 8,685 | 1.40 | 1.31 |
| 55 | 1.50 | 4,282 | 8,263 | 13,172 | 1.93 | 1.59 |
| 58 | 2.03 | 5,050 | 9,954 | 14,794 | 1.97 | 1.49 |
| 61 | 3.06 | 5,346 | 13,966 | 21,229 | 2.61 | 1.52 |
| 64 | 3.32 | 9,081 | 17,509 | 25,958 | 1.93 | 1.48 |
| 67 | 5.19 | 11,776 | 27,561 | 46,764 | 2.34 | 1.70 |
| 70 | 6.42 | 16,910 | 46,894 | 94,126 | 2.77 | 2.01 |
| 73 | 11.75 | 16,214 | 80,906 | 221,026 | 4.99 | 2.73 |
| 76 | 26.15 | 15,456 | 137,503 | 326,112 | 8.90 | 2.37 |
| 79 | 30.48 | 16,126 | 134,046 | 316,574 | 8.31 | 2.36 |
| 82 | 3.54 | 30,949 | 118,833 | 370,535 | 3.84 | 3.12 |
| 85 | 0.16 | 47,228 | 54,637 | 61,765 | 1.16 | 1.13 |
| 88 | 0.00 | 0 | 0 | 0 | 0.00 | 0.00 |
| 91 | 0.00 | 0 | 0 | 0 | 0.00 | 0.00 |
| 94 | 0.00 | 0 | 0 | 0 | 0.00 | 0.00 |
| 97 | 0.00 | 0 | 0 | 0 | 0.00 | 0.00 |
| 100 | 0.00 | 0 | 0 | 0 | 0.00 | 0.00 |
| 102 | 0.00 | 0 | 0 | 0 | 0.00 | 0.00 |
| 120 | 0.00 | 0 | 0 | 0 | 0.00 | 0.00 |
| 140 | 0.00 | 0 | 0 | 0 | 0.00 | 0.00 |
| 0 | 0.00 | 0 | 0 | 0 | 0.00 | 0.00 |
| 0 | 0.00 | 0 | 0 | 0 | 0.00 | 0.00 |
| 0 | 0.00 | 0 | 0 | 0 | 0.00 | 0.00 |
| 0 | 0.00 | 0 | 0 | 0 | 0.00 | 0.00 |
| whole | | 10,016 | 96,554 | 297,081 | 9.64 | 3.08 |

In addition, a graph (contour map) showing, as contour lines, the eluted amounts with respect to elution temperature and molecular weight is obtained as shown in FIG. 4 from the eluted amounts and the molecular weight distributions at the respective elution temperatures according to the method described in the literature: S. Nakano, Y. Goto, "Development of Automatic Cross Fractionation: Combination of Crystallizability Fractionation and Molecular Weight Fractionation," J. Appl. Polym. Sci., vol. 26, pp. 4217-4231 (1981).

Using the contour map, the following contents are determined.

$W_1$: the content of components with molecular weights less than the weight average molecular weight in the components eluted at temperatures equal to or lower than the temperature where the eluted amount determined from the integral elution curve is 50 wt %

$W_2$: the content of components with molecular weights equal to or more than the weight average molecular weight in the components eluted at temperatures equal to or lower than the temperature where the eluted amount determined from the integral elution curve is 50 wt %

$W_3$: the content of components with molecular weights less than the weight average molecular weight in the components eluted at temperatures higher than the temperature where the eluted amount determined from the integral elution curve is 50 wt %

$W_4$: the content of components with molecular weights equal to or more than the weight average molecular weight in the components eluted at temperatures higher than the temperature where the eluted amount determined from the integral elution curve is 50 wt %

In this case, $W_1+W_2+W_3+W_4=100$.

1-5. Condition (9)

In addition to conditions (1), (2), (5), and (7) described above, the ethylene-α-olefin copolymer of the present invention has a difference ($W_2-W_4$) between $W_2$ and $W_4$ of more than 0% by weight but less than 20% by weight, preferably more than 0% by weight but less than 15% by weight, more preferably more than 1% by weight but less than 15% by weight, even more preferably more than 2% by weight but less than 14% by weight, further more preferably more than 2% by weight but less than 13% by weight, wherein $W_2$ and $W_4$ have the same meanings as defined above for condition (7). An ethylene-α-olefin copolymer with a difference ($W_2-W_4$) of 0% by weight or less is not preferred because it can have a reduced content of low-density, high-molecular-weight components capable of effectively acting to improve the impact strength of polyolefin resins. On the other hand, if the value ($W_2-W_4$) is 20% by weight or more, the contents of high-density, high-molecular-weight components and low-density, high-molecular-weight components in the ethylene-α-olefin copolymer can be unbalanced, so that the effect of improving the physical properties of polyolefin resins will not be produced as expected or the ethylene-α-olefin copolymer can have poor dispersibility in polyolefin resins, which can cause degradation of transparency or gelation and thus is not preferred.

The ethylene-α-olefin copolymer of the present invention satisfies conditions (1), (2), (5), (7), and (9) described above as essential conditions. In a preferred mode, the ethylene-α-olefin copolymer of the present invention may further satisfy at least one of conditions (3), (4), (6), and (8) described below.

1-6. Condition (3)

The ethylene-α-olefin copolymer of the present invention may have a ratio (Mw/Mn) of weight average molecular weight (Mw) to number average molecular weight (Mn) of 3.0 to 5.5, preferably 3.0 to 5.3, more preferably not less than 3.0 but less than 5.1, even more preferably not less than 3.2 but less than 5.1, further more preferably 3.3 to 5.0. An ethylene-α-olefin copolymer with a Mw/Mn of less than 3.0 can provide low moldability, specifically, low melt flowability and be difficult to mix with other polymer components when blended with polyolefin resins. Therefore, such a Mw/Mn ratio should be avoided. An ethylene-α-olefin copolymer with a Mw/Mn of more than 5.5 can be insufficiently effective in improving the stiffness or impact strength of the polyolefin resin or the molded product thereof, have degraded transparency, or tend to be sticky. Therefore, such a Mw/Mn ratio is not preferred.

The Mw/Mn is an index indicating the molecular weight distribution in the copolymer. The ratio is low when the polymerization reaction on the catalyst is allowed to proceed at a relatively uniform site, whereas the ratio is high when the reaction is allowed to proceed at relatively multiple sites. In general, the ratio can be appropriately controlled by selecting the catalytic species used for the polymerization and the catalyst preparation conditions.

In the present invention, the Mw and Mn of the ethylene-α-olefin copolymer refer to the values measured by gel permeation chromatography (GPC).

The retention volume is converted to the molecular weight using a calibration curve prepared in advance with polystyrene standards. All the polystyrene standards used are the following products manufactured by Tosoh Corporation.

F380, F288, F128, F80, F40, F20, F10, F4, F1, A5000, A2500, A1000.

The calibration curve, is prepared using a solution of 0.5 mg/mL of each standard in ODCB (containing 0.5 mg/mL of BHT), which is injected in a volume of 0.2 mL. A cubic equation obtained by least squares approximation is used for the calibration curve. The conversion to the molecular weight is performed using a general-purpose calibration curve with reference to Sadao Mori, "Size Haijo Chromatography" (Size Exclusion Chromatography), Kyoritsu Shuppan Co., Ltd. In this process, the following values are used in the viscosity formula $[\eta]=K \times M^\alpha$.

PS: $K=1.38\times10^{-4}$, $\alpha=0.7$
PE: $K=3.92\times10^{-4}$, $\alpha=0.733$ The GPC measurement conditions are as follows.
System: GPC (ALC/GPC 150C) manufactured by Waters
Detector: MIRAN 1A IR Detector manufactured by FOXBORO (measurement wavelength: 3.42 μm)
Columns: AD806M/S (three columns) manufactured by Showa Denko K.K.
Mobile phase solvent: o-dichlorobenzene
Measurement temperature: 140° C.
Flow rate: 1.0 ml/minute
volume: 0.2 ml
Sample preparation: The sample is dissolved in ODCB (containing 0.5 mg/mL of BHT) at 140° C. for about 1 hour to form a 1 mg/mL, solution.

The base line and the interval for the resulting chromatogram are determined as illustrated in FIG. 1.

1-7. Condition (4)

The ethylene-α-olefin copolymer of the present invention may have a ratio (Mz/Mw) of Z weight average molecular weight (Mz) to weight average molecular weight (Mw) of 2.0 to 6.0, preferably 2.1 to 5.5, more preferably 2.2 to 5.3, even more preferably more than 2.2 but less than 5.0, further more preferably not less than 2.3 but less than 3.6. An ethylene-α-olefin copolymer with a Mz/Mw of less than 2.0 can provide low moldability, specifically, low melt flowability and be difficult to mix with other polymer components when blended with polyolefin resins. Therefore, such a Mz/Mw ratio should be avoided. An ethylene-α-olefin copolymer with a Mz/Mw of more than 6.0 can be insufficiently effective in improving the stiffness or impact strength of the polyolefin resin or the molded product thereof, have degraded transparency, or tend to be sticky, so that an excess of a high-molecular-weight component can form a gel or be highly oriented during molding to reduce the strength. Therefore, such a ratio is not preferred.

The Mz/Mw is another index indicating the molecular weight distribution in the copolymer. The ratio indicates the presence or a high-molecular-weight component, and the ratio is high when the high-molecular-weight component content is high. In general, the ratio can be appropriately controlled by selecting the catalytic species used for the polymerization. In the present invention, the Mz of the ethylene-α-olefin copolymer refers to the value measured by the gel permeation chromatography (GPC) described above.

1-8. Condition (6)

In the ethylene-α-olefin copolymer of the present invention, the content (X value) of components eluted at 85° C. or higher by temperature rising elution fractionation (TREF) may be 2 to 15% by weight, preferably 4 to 14% by weight. The X value is more preferably 5 to 14% by weight, even more preferably 6 to 14% by weight. If the X value is more than 15% by weight, the ethylene-α-olefin copolymer can have a reduced content of low-density components capable of effectively acting to improve the impact strength of polyolefin resins, so that the improvement of the impact strength will require blending a large amount of the ethylene-α-olefin copolymer, which is not economical and thus not preferred. In some cases, the ethylene-α-olefin copolymer with an X value of less than 2% by weight is not preferred because it can have low compatibility with a polyolefin resin being blended or can degrade the stiffness of the polyolefin resin. The X value is a value indicating the content of components with relatively high molecular weights in the copolymer. The X value can be controlled by controlling the catalyst preparation method and the polymerization conditions.

[TREF Measurement Conditions]

The sample is dissolved in o-dichlorobenzene (containing 0.5 mg/mL BHT) at 140° C. to form a solution. The solution is introduced into a TREF column at 140° C. and then cooled to 100° C. at a rate of decrease of 8° C./minute. Subsequently, the solution is cooled to 40° C. at a rate of decrease of 4° C./minute, then cooled to −15° C. at a rate of decrease of 1° C./minute, and then held at the temperature for 20 minutes. Subsequently, o-dichlorobenzene (containing 0.5 mg/mL BHT) as a solvent is run at a flow rate of 1 mL/minute through the column. The components dissolved in o-dichlorobenzene in the TREF column at −15° C. are eluted for 10 minutes, and then the column is linearly heated to 140° C. at a rate of increase of 100° C./hour, when an elution curve is obtained. In this process, the content of the components eluted at temperatures from 85° C. to 140° C. is determined as the X value (in units of wt %).

The following system is used.
(TREF Part)
  TREF column: 4.3 mmφ×150 mm stainless steel column
  Column packing material: 100 μm glass beads having undergone surface inactivation
  Heating system: Aluminum heat block
  Cooling system: Peltier element (cooling Peltier element with water)
  Temperature distribution: ±0.5° C.
  Temperature controller: Digital Program Controller KP1000 from CHINO Corporation
(Valve Oven)
  Heating system: Air bath oven
  Temperature during measurement: 140° C.
  Temperature distribution: ±1° C.
  Valves: Six-sided valve, four-sided valve
(Sample Injection Part)
  Injection system: Loop injection system
  Injection volume: Loop size 0.1 ml
  Injection port heating system: Aluminum heat block
  Temperature during measurement: 140° C.
(Detection Part)
  Detector: Fixed wavelength infrared detector MIRAN 1A manufactured by FOXBORO
  Detection wavelength: 3.42 μm
  High-temperature flow Cell: Micro flow Cell for LC-IR, optical path 1.5 mm, window shape 2φ×4 mm oval, synthetic sapphire window plate
  Temperature during measurement: 140° C.
(Pump Part)
  Feed pump: SSC-3461 Pump manufactured b), Senshu Scientific Co., Ltd.
Measurement Conditions
  Solvent: O-dichlorobenzene (containing 0.5 mg/mL BHT)
  Sample concentration: 5 mg/mL
  Sample injection volume: 0.1 mL
  Solvent flow: 1 mL/minute 1-9. Condition (8)

The ethylene-α-olefin copolymer of the present invention may have a sum ($W_2+W_4$) of $W_2$ and $W_4$ of more than 25% by weight but less than 50% by weight, preferably more than 29% by weight but less 50% by weight, more preferably more than 29% by weight but less than 45% by weight, even more preferably 30 to 43% by weight, further more preferably 30 to 42% by weight, wherein $W_2$ and $W_4$ have the same meanings as defined above for condition (7). If $W_2+W_4$ is 25% by weight or less, the ethylene-α-olefin copolymer can have a reduced content of high-molecular-weight components capable of effectively acting to improve the impact strength of polyolefin resins (such a reduced content is not preferred), or the ethylene-α-olefin copolymer can have a reduced content of high-molecular-weight, long-chain branching components capable of effectively acting to improve the moldability of polyolefin resins (such a reduced content is not preferred), so that due to the reduction in the content of high-molecular-weight components or long-chain branching components, a larger amount of the ethylene-α-olefin copolymer will need to be blended in order to modify polyolefin resins, which can reduce the cost effectiveness.

On the other hand, if the $W_2+W_4$ value is 50% by weight or more, the content of high-molecular-weight components or high-molecular-weight, long-chain branching components in the ethylene-α-olefin copolymer can be high so that the copolymer can have low dispersibility in a polyolefin resin to degrade transparency or form a gel, which is not preferred.

1-9. Composition of the Ethylene-α-Olefin Copolymer of the Present Invention

The ethylene-α-olefin copolymer of the present invention is a copolymer of ethylene and an α-olefin of 3 to 10 carbon atoms. Examples of the α-olefin for use as a copolymerizable component include propylene, butene-1, 3-methylbutene-1, 3-methylpentene-1, 4-methylpentene-1, pentene-1, hexene-1, heptene-1, octene-1, nonene-1, and decene-1. These α-olefins may be used singly or in combination of two or more. In particular, an α-olefin of 3 to 8 carbon atoms is preferred, examples of which include propylene, butene-1, 3-methylbutene-1, 4-methylpentene-1, pentene-1, hexene-1, heptene-1, and octene-1. An α-olefin of 4 to 6 carbon atoms is more preferred, examples of which include butene-1, 4-methylpentene-1, and hexene-1. In particular, the α-olefin preferably hexene-1.

As regards the contents or ethylene and α-olefin units, the ethylene-α-olefin copolymer of the present invention may include about 75 to about 99.8% by weight of the ethylene unit and about 0.2 to about 25% by weight of the α-olefin unit, preferably about 80 to about 99.6% by weight of the ethylene unit and about 0.4 to about 20% by weight of the α-olefin unit, more preferably about 82 to about 99.2% by of the ethylene unit and about 0.8 to about 18% by weight of the α-olefin unit, even more preferably about 85 to about 99% by weight of the ethylene unit and about 1 to about 15% by weight of the α-olefin unit, further more preferably about 88 to about 98% by weight of the ethylene unit and about 2 to about 12% by weight of the α-olefin unit. The ethylene-α-olefin copolymer with the ethylene unit content in this range is highly effective in modifying polyethylene resins.

The copolymerization may be any of alternating copolymerization, random copolymerization, and block copolymerization. It will be understood that a small amount of a comonomer or comonomers other than ethylene and α-olefins may also be used. In such a case, examples of the comonomer include styrene and styrene derivatives such as 4-methylstyrene and 4-dimethylaminostyrene, diens such as 1,4-butadiene, 1,5-hexadiene, 1,4-hexadiene, and 1,7-octadiene, norbornene, cyclic compounds such as cyclopentene, oxygen-containing compounds such as hexenol, hexenoic acid, and methyl octenoate, and other polymerizable double bond-containing compounds. It will be understood that when a diene is used, the diene needs to be used in such a range that the long-chain branching structure and the molecular weight distribution satisfy conditions (3) to (5) described above.

2. Method for Producing the Ethylene-α-Olefin Copolymer of the Present Invention The ethylene-α-olefin copolymer of the present invention to be used should be produced so as to satisfy all of conditions (1), (2), (5), (7), and (9) described above. The production is performed by a method of copolymerizing ethylene and the α-olefin using an olefin polymerization catalyst.

A preferred example of the production method capable of simultaneously achieving the conditions for the specific long-chain branching structure, compositional distribution structure, MFR, and density of the ethylene-α-olefin copolymer of the present invention may be a method using an olefin polymerization catalyst comprising specific catalyst components (A), (B), and (C) described below.

Component (A): Bridged cyclopentadienyl indenyl compound containing a transition metal element Component (B): A compound capable of reacting with the compound of the component (A) to form a cationic metallocene compound Component (C) Inorganic compound carrier 2-1. Catalyst Component (A)

The catalyst component (A), which is preferred for the production of the ethylene-α-olefin copolymer of the present invention, is a bridged cyclopentadienyl indenyl compound containing a transition metal element, preferably a metallocene compound represented by formula [1] below, more preferably a metallocene compound represented by formula [2] below.

[Chemical Formula 1]

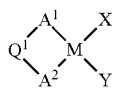

[1]

In formula [1], M represents a transition metal of Zr, or Hf, $A^1$ represents a ligand having a cyclopentadienyl ring (conjugated five-membered ring) structure, $A^2$ represents a ligand having an indenyl ring structure, represents a linking group that links $A^1$ and $A^2$ at any position, and X and Y each independently represent a hydrogen atom, a halogen atom, a hydrocarbon group of 1 to 20 carbon atoms, an oxygen or nitrogen atom-containing hydrocarbon group of 1 to 20 carbon atoms, an amino group substituted with a hydrocarbon group of 1 to 20 carbon atoms, or an alkoxy group to 20 carbon atoms.

[Chemical Formula 2]

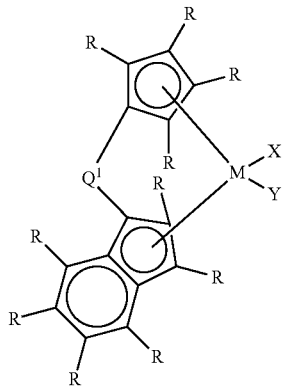

[2]

In formula [2], M represents a transition metal of Ti, Zr, or Hf, $Q^1$ represents a linking group that links the cyclopentadienyl ring and the indenyl ring, X and Y each independently represent a hydrogen atom, a halogen atom, a hydrocarbon group of 1 to 20 carbon atoms, an oxygen or nitrogen atom-containing hydrocarbon group of 1 to 20 carbon atoms, an amino group substituted with a hydrocarbon group of 1 to 20 carbon atoms, or an alkoxy group of 1 to 20 carbon atoms, and ten occurrences of R each independently represent a hydrogen atom, a halogen atom, a hydrocarbon group of 1 to 20 carbon atoms, a silicon-containing hydrocarbon group having 1 to 18 carbon atoms and 1 to 6 silicon atoms, a halogen-containing hydrocarbon group of 1 to 20 carbon atoms, an oxygen atom-containing hydrocarbon group of 1 to 20 carbon atoms, or a silyl group substituted with a hydrocarbon group of 1 to 20 carbon atoms.

The metallocene compound of formula (1c) described in JP 2013-227271 A is particularly preferred as the catalyst component (A) for the production of the ethylene-α-olefin copolymer of the present invention.

[Chemical Formula 3]

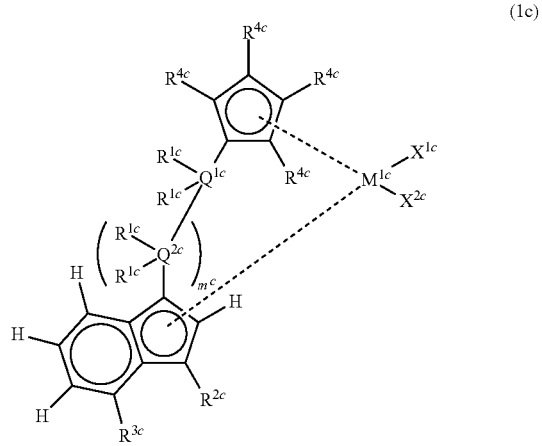

(1c)

In formula (1c), $M^{1c}$ represents a transition metal of Ti, Zr, or Hf, $X^{1c}$ and $X^{2c}$ each independently represent a hydrogen atom, a halogen atom, a hydrocarbon group of 1 to 20 carbon atoms, an oxygen or nitrogen atom-containing hydrocarbon group of 1 to 20 carbon atoms, an amino group substituted with a hydrocarbon group of 1 to 20 carbon atoms, or an alkoxy group of 1 to 20 carbon atoms, $Q^{1c}$ and $Q^{2c}$ each independently represent a carbon atom, a silicon atom, or a germanium atom, $R^{1C}$ each independently represent a hydrogen atom or a hydrocarbon group of 1 to 10 carbon atoms, at least two of four occurrences of $R^{1c}$ may be linked with $Q^{1c}$ and $Q^{2c}$ to form a ring, $m^c$ represents 0 or 1 provided that when $m^c$ is 0, $Q^{1c}$ is bonded directly to the and $R^{2c}$-containing conjugated five-membered ring, $R^{2c}$ and $R^{4c}$ each independently represent a hydrogen atom, a halogen atom, a hydrocarbon group of 1 to 20 carbon atoms, a silicon-containing hydrocarbon group having 1 to 18 carbon atoms and 1 to 6 silicon atoms, a halogen-containing hydrocarbon group of 1 to 20 carbon atoms, an oxygen atom-containing hydrocarbon group of 1 to 20 carbon atoms, or a silyl group substituted with a hydrocarbon group of 1 to 20 carbon atoms, and $R^{3c}$ represents a substituted aryl group represented by formula (1-ac) below.

[Chemical Formula 4]

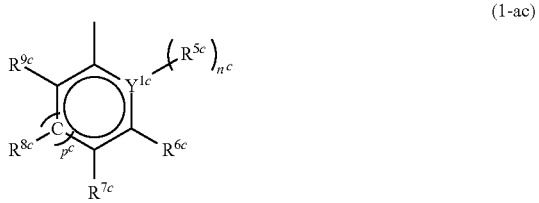

(1-ac)

In formula (1-ac), $Y^{1c}$ represents an atom belonging to Group 14, 15, or 16 of the periodic table, $R^{5c}$, $R^{6c}$, $R^{7c}$, $R^{8c}$, and $R^{9c}$ each independently represent a hydrogen atom, a fluorine atom, a chlorine atom, a bromine atom, a hydrocarbon group of 1 to 20 carbon atoms, an oxygen- or nitrogen-containing hydrocarbon group of 1 to 20 carbon atoms, an amino group substituted with a hydrocarbon group of 1 to 20 carbon atoms, an alkoxy group of 1 to 20 carbon atoms, a silicon-containing hydrocarbon group having 1 to 18 carbon atoms and 1 to 6 silicon atoms, a halogen containing hydrocarbon group of 1 to 20 carbon atoms, or a silyl group substituted with a hydrocarbon group of 1 to 20 carbon atoms, adjacent ones of $R^{5c}$, $R^{6c}$, $R^{7c}$, $R^{8c}$, and $R^{9c}$ may be linked together to form a ring together with an atom or atoms bonded thereto, $n^c$ represents 0 or 1, provided that when $n^c$ is 0, $Y^{1c}$ does not have the substituent $R^{5c}$, and $p^c$ represents 0 or 1, provided that when $p^c$ is 0, the carbon atom bonded to $R^{7c}$ is bonded directly to the carbon atom bonded to $R^{9c}$, provided that when $Y^{1c}$ is a carbon atom, at least one of $R^{5c}$, $R^{6c}$, $R^{7c}$, $R^{8c}$, and $R^{9c}$ is not a hydrogen atom.

The metallocene compound represented by formula (2c) described in JP 2013-227271 A is most preferred as the catalyst component (A) for the production of the ethylene-α-olefin copolymer of the present invention.

[Chemical Formula 5]

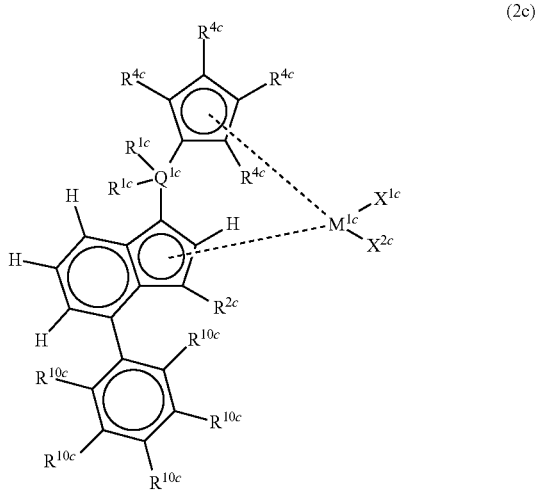

(2c)

In the metallocene compound represented by formula (2c) above, $M^{1c}$, $X^{1c}$, $X^{2c}$, $Q^{1c}$, $R^{1c}$, $R^{2c}$, and $R^{4c}$ may be selected from the corresponding atoms and groups shown in the metallocene compound represented by formula (1c) above. $R^{10c}$ may be selected from the atoms and groups for $R^{5c}$, $R^{6c}$, $R^{7c}$, $R^{8c}$, and $R^{9c}$ shown in the metallocene compound represented by formula (1c) above.

Examples of the above metallocene compounds include, but are not limited to, the compounds represented by formula (4c) and shown in Tables 1c-1 to 5 and the compounds represented by formulae (5c) and (6c) and shown in Tables 1c-6 to 9 in JP 2013-227271 A.

Examples of the above compounds are preferably zirconium compounds or hafnium compounds, more preferably zirconium compounds.

Two or more of the above bridged cyclopentadienyl indenyl compounds are also preferably used as the catalyst component for the production of the ethylene-α-olefin copolymer of the present invention.

2-2. Catalyst Component (B)

The catalyst component (B) preferable for the production of the ethylene-α-olefin copolymer of the present invention is a compound capable of reacting with the compound of the component (IV) to form a cationic metallocene compound, more preferably the component (B) shown in paragraphs [0064] to [0083] of JP 2013-227271 A, even more preferably the organoaluminumoxy compound shown in paragraphs [0065] to [0069] of the same publication.

2-3. Catalyst Component (C)

The catalyst component (C) preferable for the production of the ethylene-α-olefin copolymer of the present invention is an inorganic compound carrier, more preferably the inorganic compound described in paragraphs [0084] to [0088] of JP 2013-227271 A. In this case, the inorganic compound is preferably the metal oxide described in paragraph [0085] of the publication.

2-4. Method for Producing Olefin Polymerization Catalyst

The ethylene-α-olefin copolymer of the present invention is preferably produced by a method or copolymerizing ethylene and the α-olefin using the olefin polymerization catalyst comprising the catalyst components (A) to (C). The method for bringing the catalyst components (A) to (C) into contact with one another to form the olefin polymerization catalyst may be typically, but not limited to, any of the methods (I) to (III) shown below.

(I) A method comprising bringing the transition metal element-containing, bridged cyclopentadienyl indenyl compound as the catalyst component (A) into contact with the catalyst component (B) capable of reacting with the compound of the catalyst component (A) to form a cationic metallocene compound and then bringing the inorganic compound carrier as the catalyst component (C) into contact.

(II) A method comprising bringing the catalyst components (A) and (C) into contact with each other and then bringing the catalyst component (B) into contact.

(III) A method comprising bringing the catalyst components (B) and (c) into contact with each other and then bringing the catalyst component (A) into contact.

Among these contact methods, the methods (I) and are preferred, and the method (I) is most preferred. In all the contact methods, the respective components are generally brought into contact with each other in an inert atmosphere such as nitrogen or argon in the presence of an inert liquid hydrocarbon such as an aromatic hydrocarbon (generally of 6 to 12 carbon atoms) such as benzene, toluene, xylene, or ethylbenzene or an aliphatic or alicyclic hydrocarbon (generally of 5 to 12 carbon atoms) such as pentane, heptane, hexane, decane, dodecane, or cyclohexane, either with or without stirring. The contact is generally performed at a temperature of −100° C. to 200° C., preferably at a temperature of −50° C. to 100° C., more preferably at a temperature of 0° C. to 50° C., for 5 minutes to 50 hours, preferably for 30 minutes to 24 hours, more preferably for 30 minutes to 12 hours.

As mentioned above, the process of bringing the catalyst components (A), (B), and (C) into contact with one another may be performed using any of an aromatic hydrocarbon solvent, in which some of the components are soluble or less soluble, and an aliphatic or alicyclic hydrocarbon solvent, in which some of the components are insoluble or less soluble.

When the contact reactions between the respective components are performed in a stepwise manner, the solvent used in the earlier stage may be used directly as the solvent for the later contact reaction without being removed. The contact method may also comprise performing an earlier contact reaction using a soluble solvent, then adding an inert liquid hydrocarbon (such as an aliphatic, alicyclic, or aromatic hydrocarbon such as pentane, hexane, decane, dodecane, cyclohexane, benzene, toluene, or xylene), in which some of the components are insoluble or less soluble, to collect the desired product as a solid, or temporarily removing part or the whole of the soluble solvent by drying or other means to take out the desired product as a solid, and then subjecting the desired product to a later contact reaction using any of the above inert hydrocarbon solvents. In the present invention, the contact reaction of each component may also be performed a plurality of times.

In the present invention, the catalyst components (A), (B), and (C) are preferably used in ratios within the range shown below although they may be used in any ratios.

When an organoaluminumoxy compound is used as the catalyst component (B), the atomic ratio (Al/M) of aluminum in the organoaluminumoxy compound to the transition metal (M) in the catalyst component (A) is generally in the range of 1 to 100,000, preferably 100 to 1,000, more preferably 210 to 800, even more preferably 250 to 500. When a borane compound or a borate compound is used, the atomic ratio (B/M) of boron to the transition metal (M) in the catalyst component (A) is generally selected in the range of 0.01 to 100, preferably 0.1 to 50, more preferably 0.2 to 10. When a mixture of an organoaluminumoxy compound and a borane or borate compound is used as the catalyst component (B), the content of each compound in the mixture is preferably selected so as to have the same ratio to the transition metal (M) as shown above.

The catalyst component (C) may be used in an amount of 1 g per 0.0001 to 5 millimoles, preferably 0.001 to 0.2 millimoles, more preferably 0.005 to 0.1 millimoles, even more preferably 0.01 to 0.04 millimoles of the transition metal in the catalyst component (A).

In the present invention, the ratio of the number of moles of the metal in the catalyst component (B) to 1 g of the catalyst component (C) is preferably more than 0.006 to 0.020 (moles/g), more preferably more than 0.006 to 0.015 (moles/g), even more preferably more than 0.006 to 0.012 (moles/g), further more preferably 0.007 to 0.010 (moles/g).

The olefin polymerization catalyst can be obtained as a solid catalyst by bringing the catalyst components (A), (B), and (C) into contact with one another using the method appropriately selected from the contact methods (I) to (III) and then removing the solvent. The removal of the solvent may be performed under the ambient pressure or reduced pressure at 0 to 200° C., preferably 20 to 150° C., more preferably 20 to 100° C. for 1 minute to 100 hours, preferably 10 minutes to 50 hours, more preferably 30 minutes to 20 hours.

The olefin polymerization catalyst may also be obtained by the method (IV) or (V) shown below.

(IV) A method comprising bringing the catalyst components (A) and (C) into contact with each other, removing the solvent to form a solid catalyst component, and bringing the solid catalyst component into contact with an organoaluminumoxy compound, a borane compound, a borate compound, or any mixture thereof under polymerization conditions.

(V) A method comprising bringing the catalyst component (C) into contact with an organoaluminumoxy compound, a borane compound, a borate compound, or any mixture thereof as the catalyst component (B), removing the solvent to form a solid catalyst component, and bringing the solid catalyst component into contact with the catalyst component under polymerization conditions.

Also in the case of the contact method (IV) or (V), the same conditions as described above may be used with respect to the component ratio, the contact conditions, and solvent removal conditions.

A well-known layered silicate such as that described in JP H05-301917 A or JP H08-127613 A may also be used as a component for serving as both the catalyst component (B) (capable of reacting with the catalyst component (A) to form a cationic metallocene compound) and the catalyst component (C) for the olefin polymerization catalyst preferable for the production of the ethylene-α-olefin copolymer of the present invention. A layered silicate is a silicate compound having a crystal structure in which planes formed by ionic bonding or the like are stacked in parallel with a weak bonding force. Although most layered silicates naturally occur as main components of clay minerals, not only naturally-occurring layered silicates but also synthetic silicates may be used.

Preferred examples thereof include montmorillonite, sauconite, beidellite, nontronite, saponite, hectorite, stevensite, bentonite, smectite group minerals such as taeniolite, vermiculite group minerals, and mica group minerals.

The catalyst component (A) and the layered silicate carrier are preferably used in a ratio within the range shown below, although they may be used in any ratio. The amount of the catalyst component (A) supported per 1 g of the layered silicate carrier may be 0.0001 to 5 millimoles, preferably 0.001 to 0.5 millimoles, more preferably 0.01 to 0.1 millimoles.

If necessary, the olefin polymerization catalyst obtained as described above may be used after the monomers are subjected to prepolymerization.

2-5. Polymerization Method for Ethylene-α-Olefin Copolymer

The ethylene-α-olefin copolymer of the present invention is preferably produced by copolymerizing ethylene and the α-olefin using the olefin polymerization catalyst prepared by the method described above in the section 2-4.

As mentioned above, an α-olefin of 3 to 10 carbon atoms may be used as a comonomer. Two or more α-olefins may also be copolymerized with ethylene. Any comonomer other than the α-olefin may also be used in a small amount.

In the present invention, the copolymerization reaction is preferably performed by a gas phase method or a slurry method. In the case of gas phase polymerization, ethylene and the comonomer or comonomers are polymerized by introducing, distributing, or circulating gas flows of ethylene and the commoner or comonomers into or in a reaction vessel while oxygen, water, and other gases are substantially shut off. In the case of slurry polymerization, ethylene and the comonomer or comonomers are polymerized in the presence or absence of an inert hydrocarbon solvent selected from an aliphatic hydrocarbon such as isobutene, hexane, or heptane, an aromatic hydrocarbon such as benzene, toluene, or xylene, and an alicyclic hydrocarbon such as cyclohexane or methylcyclohexane. It will be understood that a liquid monomer such as liquid ethylene or liquid propylene may also be used as a solvent. In the present invention, gas phase polymerization is more preferred. The polymerization conditions generally used include a temperature of 0 to 250° C., preferably 20 to 110° C., more preferably 60 to 100° C., a pressure in the range of ambient pressure to 10 MPa, preferably ambient pressure to 4 MPa, more preferably 0.5 to 2 MPa, and a polymerization time of 5 minutes to 20 hours, preferably 30 minutes to 10 hours.

In order to obtain a copolymer with long-chain branching in an appropriate range and with a relatively narrow comonomer composition distribution having an appropriate content of low-density, high-molecular-weight components (one of the features of the present invention), appropriate preparation can be achieved by selecting the type of the catalyst components and (B) to be used and changing polymerization conditions such as the molar ratio between the catalyst components (A) and (B), (A) and (C), or (B) and (C), the polymerization temperature, the ethylene partial pressure, the H2/C2 ratio, and the comonomer/ethylene ratio.

Specifically, for example, when the complex shown in Example 1 below is used, the catalyst may be controlled under the following conditions: the complex/silica=10 to 40 μmol/g and organoaluminumoxy compound/silica=7 to 10 mmol/g, a modifier may be used as needed, and the polymerization conditions may be appropriately set in the following ranges: 60 to 90° C., ethylene partial pressure 0.3 to 2.0 MPa, H2/C2(%)=0.2 to 2.0%, and C6/C2=0.1 to 0.8%.

An agent for removing water, specifically, what is called a scavenger may also be added to the polymerization system. Even in such a case, the polymerization can also be performed without any trouble.

Examples of such a scavenger that may be used include organoaluminum compounds such as trimethylaluminum, triethylaluminum, and triisobutylaluminum, the organoaluminumoxy compound, branched alkyl-containing modified organoaluminum compounds, organozinc compounds such as diethylzinc and dibutylzinc, organomagnesium compounds such as diethylmagnesium, dibutylmagnesium, and ethylbutylmagnesium, and Grignard compounds such as ethylmagnesium chloride and butylmagnesium chloride. Among them, triethylaluminum, triisobutylaluminum, and ethylbutylmagnesium are preferred, and triethylaluminum is particularly preferred.

The long-chain branching structure (namely $g_c$) and the copolymerized comonomer composition distribution (namely X and $W_1$ to $W_4$) of the copolymer formed (one of the features of the present invention) can be controlled by changing polymerization conditions such as the molar ratio of the catalyst, the polymerization temperature and pressure, and the polymerization time or changing the polymerization process, although the range of the long-chain branching structure and the composition distribution are substantially determined by the type of the catalyst components (A) and (B). Even when the catalyst component species selected tends to produce a long-chain branching structure, a copolymer with a low content of a long-chain branching structure can be produced through, for example, lowering the polymerization temperature or raising the pressure of ethylene. Even when the catalyst component species selected tends to widen the molecular weight distribution or the copolymerized composition distribution, a copolymer with a narrow molecular weight distribution or a narrow copolymerized composition distribution can be produced through, for example, changing the molar ratio between the catalyst components, the polymerization conditions, or the polymerization process.

If the polymerization conditions are appropriately selected, the ethylene-α-olefin copolymer of the present invention could be produced even by a two or multi-stage polymerization process in which the stages differ from one another in polymerization conditions such as the hydrogen concentration, the amount of the monomers, the polymerization pressure, and the polymerization temperature. However, the ethylene-α-olefin copolymer of the present invention should preferably be produced by single-stage polymerization reaction, so that it can be produced more economically without setting of complicated polymerization operation conditions.

3-1. Olefin Resin Composition

In view of its significant modification effect, the ethylene-α-olefin copolymer of the present invention can be used together with an additional olefin resin to form an olefin resin composition.

The additional olefin resin may be an ethylene resin such as another ethylene-α-olefin copolymer (B) different from the ethylene-α-olefin copolymer of the present invention (hereinafter referred to as the "ethylene-α-olefin copolymer (A)") or any other olefin resin.

For the purpose of modification, the content of the ethylene-α-olefin copolymer (A) in the resin composition is preferably 1 to 59% by weight, more preferably 1 to 49% by weight, even more preferably 3 to 39% by weight, based on 100% by weight of the resin composition.

3-2. Additional Ethylene-α-Olefin Copolymer (B)

The additional ethylene-α-olefin copolymer (B) may be linear low-density polyethylene (LLDPE) having substantially no long-chain branching structure, having a linear molecular structure, and obtained using, for example, a Ziegler catalyst, or may be metallocene polyethylene having a linear molecular structure and a narrower molecular weight distribution and obtained using a metallocene catalyst.

In particular, an ethylene-α-olefin copolymer satisfying physical properties (B-1) and (B-2) below is preferably used, so that the copolymer (A) exerts its modification effect.

(B-1) MFR=0.01 to 20 g/10 minutes
(B-2) Density=0.880 to 0.970 g/cm$^3$

Metallocene polyethylene satisfying physical property (B-3) below is more preferably used as the additional ethylene-α-olefin copolymer (B), so that the copolymer (A) more effectively exerts its modification effect.

(B-3) Mw/Mn=2.0 to 4.0

In this regard, MFR, density, Mw/Mn have the same meanings as those defined above for the copolymer (A).

1-1. Condition (B-1)

The ethylene-α-olefin copolymer (B) may have a melt flow rate (MFR$_B$) of 0.01 to 20.0 g/10 minutes, preferably 0.1 to 5.0 g/10 minutes. When a copolymer with a relatively wide molecular weight distribution (which often exhibits a Q value (described later) of more than 3.0) obtained using a Ziegler catalyst is used as the copolymer (B), it more preferably has a MFR in the range of 0.3 to 3.0 g/10 minutes. On the other hand, when a copolymer with a relatively narrow molecular weight distribution (which often exhibits a Q value (described later) of 2.0 to obtained using a metallocene catalyst is used as the copolymer (B), more preferably has a MFR in the range of 0.3 to 4.0 g/10 minutes. The copolymer (B) with too low a MFR$_B$ can have low moldability, whereas the copolymer (B) with too high a $MFR_B$ can have a reduced level of impact resistance, mechanical strength, or other properties.

1-2. Condition (B-2)

The ethylene-α-olefin copolymer (B) may have a $density_B$ of 0.880 to 0.970 g/cm³, preferably 0.880 to 0.950 g/cm³, more preferably 0.890 to 0.940 g/cm³. The copolymer (B) with a $density_B$ in this range has a good balance between impact resistance and stiffness. The copolymer (B) with too low a $density_B$ may have reduced stiffness and lack suitability for automatic bag-making. The copolymer (B) with too high a $density_B$ may lack impact resistance.

Condition (B-3)

The ethylene-α-olefin copolymer (B) may have a ratio $[Mw/Mn]_B$ (hereinafter also referred to as a Q value) of weight average molecular weight (Mw) to number average molecular weight (Mn) of 2.0 to 10.0. The ethylene-α-olefin copolymer (B) with a Q value of less than 2.0 may resist mixing with other polymer components. If the Q value exceeds 10.0, the effect of improving impact resistance will be insufficient, and the balance between impact resistance and stiffness will be disturbed. For the balance between impact resistance and stiffness, the Q value preferably has an upper limit of 7.5 or less, more preferably 5.0 or less. The Q value preferably has a lower limit of 2.3 or more, more preferably 2.5 or more.

When a copolymer obtained with a Ziegler catalyst is used as the copolymer (B), it preferably has a Q value or more than 3.0 but not more than 5.0 g/10 minutes. When a copolymer obtained with a metallocene catalyst is used as the copolymer (B), it preferably has a Q value of 2.0 to 4.0 g/10 minutes. The ratio $[Mw/Mn]_B$ between the weight average molecular weight (Mw) and the number average molecular weight (Mn) of the ethylene-α-olefin copolymer (B) refers to the value measured under the conditions below (hereinafter also referred to as "the method for measuring the molecular weight distribution"). Mw/Mn is defined as the ratio (Mw/Mn) between the weight average molecular weight (Mw) and the number average molecular weight (Mn) measured by gel permeation chromatography (GPC).

1-4. Composition of Ethylene-α-Olefin Copolymer (B)

The ethylene-α-olefin copolymer (B) component may be a copolymer of ethylene and an α-olefin of 3 to 20 carbon atoms. In this case, the α-olefin used as a component to be copolymerized may be the same as that used for the ethylene-α-olefin copolymer described above.

As regards the contents of ethylene and α-olefin units, the ethylene-α-olefin copolymer (B) may include about 80 to 100% by weight of the ethylene unit and 0 to about 20% by weight of the α-olefin unit, preferably about 85 to about 99.9% by weight of the ethylene unit and about 0.1 to about 15% by weight of the α-olefin unit, more preferably about 90 to about 99.5% by weight of the ethylene unit and about 0.5 to about 10% by weight of the α-olefin unit, even more preferably about 90 to about 99% by weight of the ethylene unit and about 1 to about 10% by weight of the α-olefin unit. When the ethylene unit content falls within this range, the polyethylene resin composition or the molded product thereof has a good balance between stiffness and impact strength.

1-5. Method for Producing Ethylene-α-Olefin Copolymer (B)

The ethylene-α-olefin copolymer (13) can be produced by a method of homo-polymerization of ethylene or copolymerization of ethylene and the α-olefin using an olefin polymerization catalyst.

There are now known a variety of olefin polymerization catalysts, and any olefin polymerization catalyst may be used as long as the ethylene-α-olefin copolymer (B) can be prepared within the limits of modification of the composition of catalyst components, polymerization conditions, and post treatment conditions. However, examples of olefin polymerization catalysts suitable for the production of the ethylene-α-olefin copolymer (B) include transition metal-containing catalysts (i) and (ii) described below, which are technical examples economically satisfactory at an industrial level.

(i) Ziegler Catalyst

A Ziegler-Natta catalyst comprising a combination of a transition metal compound and an alkyl compound of a typical metal or the like and serving as a catalyst for olefin coordination polymerization is an example of the olefin polymerization catalyst preferable for the production of the ethylene-α-olefin copolymer (B). In particular, what is called a Mg—Ti Ziegler catalyst (see, for example, Shokubai Katsuyou Daijiten (Practical Dictionary of Catalysts) published by Kogyo Chosakai, 2004 and Shutsugan Keitou Zu—Olefin Jugo Shokubai no Hensen—(Application Flow Chart—History of Olefin Polymerization Catalyst—) published by Japan Institute of Invention and Innovation, comprising a combination of an organoaluminum compound and a solid catalyst component comprising a titanium compound supported on a magnesium compound is preferred because of its low price, high activity, and high suitability for polymerization process.

(ii) Metallocene Catalyst

A metallocene catalyst comprising a metallocene transition metal compound and a co-catalyst component and serving as an olefin polymerization catalyst (see, for example, Metallocene Shokubai ni-yoru Jisedai Polymer Kogyoka Gijutsu (Next-Generation Polymer Engineering Technology with Metallocene Catalysts) (Vol. 1 & 2) published by Inter-Research, 1994) can be used as another example of the polymerization catalyst preferable for the production of the ethylene-α-olefin copolymer (B) because it is relatively inexpensive, has high activity and high suitability for polymerization process, and allows the production of ethylene polymers with a narrow molecular weight distribution and a narrow copolymer composition distribution.

II. Olefin Resin Composition

Hereinafter, a detailed description will be given of an olefin resin composition comprising, as main components, the ethylene-α-olefin copolymer (A) of the present invention and an additional ethylene-α-olefin copolymer (B) other than the copolymer (A) and being suitable mainly for film applications.

Specifically, the olefin resin composition for use in films or sheets may be a composition comprising: 1 to 49% by weight, preferably 3 to 35% by weight of the specific ethylene-α-olefin copolymer (A) of the present invention; and 99 to 51% by weight, preferably 75 to 97% by weight of an additional ethylene-α-olefin copolymer (B) other than the copolymer (A). Optionally, the composition more preferably comprises 1 to 30% by weight of an additional olefin resin component (C).

1. MFR

The film-forming olefin resin composition comprising the components (A) and (B) needs to have a MFR of 0.01 to 20 g/10 minutes, and preferably has a MFR of 0.05 to 10 g/10 minutes, more preferably 0.10 to 5 g/10 minutes.

The composition with a MFR of less than 0.01 g/10 minutes can have poor fluidity and cause too high a load on an extruder motor. On the other hand, the composition with a MFR of more than 20 g/10 minutes can make bubbles unstable, be difficult to mold, and form a film with low strength.

The MFR of the olefin resin composition is the value measured under the conditions of 100° C. and a load of 21.18 N (2.16 kg) according to JIS K 7210. Approximately, the MFR can be calculated from the MFRs of the components (A) and (B) and their contents according to the sum rule.

2. Density

The olefin resin composition of the present invention comprising the components (A) and (B) needs to have a density of 0.910 to 0.950 g/cm$^3$, and preferably has a density of 0.910 to 0.945 g/cm$^3$, more preferably 0.915 to 0.940 g/cm$^3$.

The olefin resin composition with a density of less than 0.910 g/cm$^3$ can form a low-stiffness film and have reduced suitability for automatic bag-making machines. The olefin resin composition with a density of more than 0.950 g/cm$^3$ can form a film with reduced strength.

The density of the olefin resin composition can be calculated from the densities of the components (A) and (B) and their contents according to the sum rule.

3. Relation Between MFRs of Components (A) and (B)

The components (A) and (B) used to form the olefin resin composition of the present invention preferably satisfy the relation $MFR_B > MFR_A$ or the relation $20 > MFR_B/MFR_A > 1.0$, more preferably the relation $15.0 > MFR_B/MFR_A > 1.0$, even more preferably the relation $10.0 > MFR_B/MFR_A > 1.0$, wherein $MFR_A$ and $MFR_B$ represent the MFRs of the components (A) and (B), respectively.

When the MFRs of the components (A) and (B) satisfy the relation $MFR_B > MFR_A$, the addition of the component (A) can make bubbles more stable. When the relation $20 > MFR_B/MFR_A > 1.0$ is satisfied, bubbles can be stabilized during blown film molding in which the component (B) is added, so that the molding properties can be improved.

4. Relation Between [Mw/Mn] of Components (A) and (B)

The components (A) and (B) used to form the olefin resin composition of the present invention preferably satisfy the relation $[Mw/Mn]_B < [Mw/Mn]_A$, wherein $[Mw/Mn]_A$ represents the [Mw/Mn] of the component (A), and $[Mw/Mn]_B$ represents the [Mw/Mn] of the component (B).

When the [Mw/Mn] of the component (A) and the [Mw/Mn] of the component (B) satisfy the relation $[Mw/Mn]_B < [Mw/Mn]_A$, bubbles can be stabilized during blown film molding in which the component (B) is added, so that the molding properties can be improved.

6. Other Components

In the present invention, if necessary, a known additive such as an antistatic agent, an antioxidant, anti-blocking agent, a nucleating agent, a lubricant, an anti-fogging agent, an organic or inorganic pigment, an ultraviolet absorber, or a dispersing agent may be added to the composition as long as the features of the present invention are not impaired.

The olefin resin composition of the present invention may be produced in the form of pellets by mixing the ethylene-α-copolymer (A), the additional olefin resin, and optionally added or compounded additives and resin components using a Henschel mixer, Super Mixer, a tumbler mixer, or the like and then heating and kneading the mixture using a uniaxial or biaxial extruder, a kneader, or the like.

III. Applications of Ethylene-α-Olefin Copolymer (A) or Olefin Resin Composition The ethylene-α-olefin copolymer (A) of the present invention, which is remarkably effective in improving particularly the balance between impact strength and stiffness, can be used as a resin modifier, which is to be added to other olefin resins. The ethylene-α-olefin copolymer (A) of the present invention can also be used alone to form films and other products. Therefore, the ethylene-α-olefin copolymer (A) of the present invention or the olefin resin composition containing the copolymer (A) can be subjected to a known molding method such as blown film molding, T-die film molding, or any other extrusion molding, injection molding, or compression molding to form a variety of molded products.

The molded product of the copolymer (A) or the polyethylene resin composition according to the present invention can be produced by molding the copolymer (A) or the polyethylene resin composition described above in the section [II]. The molding may be performed with reference to any conventionally known molding methods.

The molded product of the present invention may be formed by any method that allows effective use of the superior molding properties, mechanical properties, and transparency of the polyethylene resin composition of the present invention. When the polyethylene resin composition is formed into a film, bag, or sheet, which is an example of the main intended use of the composition, preferred examples of the molding method, molding conditions, and use include, but not limited to, various blown film molding methods, T-die film molding methods, calender molding methods, multilayer film forming methods using a multilayer co-extrusion machine or a lamination process, and various uses therefrom.

The thickness of the film (or sheet) product obtained in such a way is not limited, and the preferred thickness thereof varies with the molding method or conditions. For example, a film (or sheet) with a thickness of about 5 to about 300 μm may be obtained by blown film molding, and a film (or sheet) with a thickness of about 5 μm to about 5 mm may be obtained by T-die molding. The polyethylene resin composition of the present invention can also be used as a modifier to improve moldability, mechanical strength, or other properties by being blended in a suitable amount with any other polyethylene resin, polyethylene resin composition, or polyolefin resin such as polypropylene resin.

EXAMPLES

Hereinafter, the present invention will be more specifically described with reference to examples and comparative examples, which will demonstrate the excellence of the present invention and the superiority of the features of the present invention, but are not intended to limit the present invention.

The measurement methods used in the examples and the comparative examples are as shown below. The catalyst synthesis process and the polymerization process described below were all performed under a purified nitrogen atmosphere, and the solvent used had undergone dehydration and purification with molecular sieve 4A.

[Methods for Evaluating Film]

(1) Tensile Modulus:

According to JIS K 7127:1999, the tensile modulus of the film was measured when the film was deformed by 1% in the machine direction (MD direction) of the film and in the transverse direction (TD direction) of the film.

(2) Dart Drop Impact Strength

The dart drop impact strength of the film was measured by the method according to JIS K7124 1A.

[Blown Film Molding Conditions]

The film to be evaluated was formed by blown film molding under the molding conditions below using an blown film forming machine (molding apparatus) equipped with a 50 mmφ extruder shown below.

Apparatus: Blown film molding apparatus
Extruder screw diameter: 50 mmφ
Die diameter: 75 mmφ
Extrusion rate: 15 kg/hr
Die lip gap: 3.0 mm
Drawing rate: 20.0 m/minute
Blow-up ratio: 2.0
Resin molding temperature: 170 to 190° C. (shown in the examples)
Film thickness: 30 μm Example 1

(1) Synthesis of Bridged Cyclopentadienyl Indenyl Compound

Dimethylsilylene(4-(4-trimethylsilyl-phenyl)-indenyl) (cyclopentadienyl)zirconium dichloride was synthesized as shown below according to the method described in paragraphs [0140] to [0143] of JP 2013-227271 A.

(II) Materials Used

[Synthesis of Metallocene Compound]

(i) Metallocene Compound A: Synthesis of dimethylsilylene(4-(4-trimethylsilyl-phenyl)-indenyl) (cyclopentadienyl)zirconium dichloride (1-1) Synthesis of 4-(4-trimethylsilyl-phenyl)-indene To a 500-ml flask were added 10.0 g (51.5 mmol) of 4-trimethylsilylphenylboronic acid and 200 ml of dimethoxyethane to form a solution. Subsequently, 27.3 g (128 mmol) of potassium phosphate, 100 ml of water, 8.37 g (43.0 mmol) of 4-bromoindene, 0.22 g (0.86 mmol) of triphenylphosphine, and 0.300 g (0.430 mmol) of $PdCl_2(PPh_3)_2$ were sequentially added to the flask and stirred under reflux for 12 hours. After cooling to room temperature, 100 ml of water was added to the flask. After the organic phase was separated, the aqueous phase was extracted twice with 100 ml of ethyl acetate. The resulting organic phases were combined and washed with brine. Sodium sulfate was then added to dry the organic phase. After the sodium sulfate was filtered, the solvent was removed by distillation under reduced pressure. The residue was purified on a silica gel column to give 9.0 g (yield 79%) of 4-(4-trimethylsilyl-phenyl)-indene as a yellow liquid.

(1-2) Synthesis of (4-(4-trimethylsilyl-phenyl)-indenyl) (cyclopentadienyl)dimethylsilane To a 200-ml flask were added 16.2 g (61.2 mmol) of 4-(4-trimethylsilyl-phenyl)-indene and 100 ml of THF to form a solution. After the solution was cooled to −78° C., 29.4 ml (173.5 mmol) of an n-butyllithium/hexane solution (2.5M) was added to the solution. The mixture was returned to room temperature and stirred for 4 hours. A 300-ml flask was separately provided, to which 14.8 ml (122 mmol) of dimethyldichlorosilane and 20 ml of THF were added to form a solution. The solution was cooled to −78° C., to which the reaction solution obtained previously was added. The mixture was returned to room temperature and stirred for 12 hours. The volatile matter was removed by distillation under reduced pressure, so that 21.8 g of a yellow solution was obtained. To the yellow solution was added 80 ml of THF to form a solution, to which 36.7 ml (73.5 mmol) of a CpNa/THF solution (2M) was added at −30° C. The mixture was returned to room temperature and stirred for 1 hour, and then 100 ml of ice water was added thereto. The reaction mixture was extracted twice with 100 ml of ethyl acetate. The resulting organic phases were combined and washed with brine. Sodium sulfate was then added to dry the organic phase. After the sodium sulfate was filtered, the solvent was removed by distillation under reduced pressure. The residue was purified on a silica gel column to give 12.0 g (yield 51%) of (4-(4-trimethylsilyl-phenyl)-indenyl) (cyclopentadienyl)dimethylsilane as a yellow liquid.

(1-3) Synthesis of dimethylsilylene(4-(4-trimethylsilyl-phenyl)-indenyl) (cyclopentadienyl)zirconium dichloride To a 300-ml flask were added 1.20 g (3.00 mmol) of (4-(4-trimethylsilylphenyl)indenyl) (cyclopentadienyl)dimethylsilane and 20 ml of diethyl ether and then cooled to −70° C. To the mixture was dropwise added 2.60 ml (6.60 mmol) of a 2.5 mol/L n-butyllithium-n-hexane solution. After the completion of dropwise addition, the mixture was returned to room temperature and stirred for 2 hours. The solvent was removed from the reaction liquid by distillation under reduced pressure. After 30 ml of dichloromethane was added to the residue, the mixture was cooled to −70° C. in a dry ice-methanol bath. To the mixture was then added 0.770 g (3.30 mmol) of zirconium tetrachloride. Subsequently, the mixture was stirred overnight while gradually returned to room temperature. After the reaction liquid was filtered, the solvent was removed from the resulting filtrate by distillation under reduced pressure, so that a yellow powder was obtained. The powder was recrystallized from 10 ml of toluene to give 0.500 g (yield 31%) of dimethylsilylene(4-(4-trimethylsilylphenyl)indenyl) (cyclopentadienyl)zirconium dichloride as a yellow crystal.

$^1$H-NMR values ($CDCl_3$): δ 0.21 (s, 3H), δ 0.23 (s, 9H), δ 0.43 (s, 3H), δ 5.48 (m, 1H), δ 5.51 (m, 1H), δ 5.81 (d, 1H), δ 6.60 (m, 1H), δ 6.66 (m, 1H), δ 6.95 (dd, 1H), δ 7.13 (s, 1H), δ 7.39 (dd, 2H), δ 7.57 (d, 2H), δ 7.95 (d, 2H).

(2) Synthesis of Olefin Polymerization Catalyst

Under a nitrogen atmosphere, 30 g of silica, which had been baked at 400° C. for 5 hours, was added to a 500-ml three-neck flask and then dried under reduced pressure for 1 hour using a vacuum pump while heated at 150° C. in an oil bath. Under a nitrogen atmosphere, 410 mg of dimethylsilylene(4-(4-trimethylsilyl-phenyl)-indenyl) (cyclopentadienyl)zirconium dichloride synthesized in the section (1) was added to a 200-ml two-neck flask provided separately, and dissolved with 80.4 ml of dehydrated toluene. At room temperature, 82.8 ml of a 20% methylaluminoxane/toluene solution manufactured by Albemarle Corporation was then added to the resulting solution and stirred for 30 minutes. The whole amount of the toluene solution of the reaction product of the zirconocene complex with methylaluminoxane was added to the 500-ml three-neck flask containing vacuum-dried silica, while the flask was heated with stirring in an oil bath at 40° C. After the mixture was stirred at 40° C. for 1 hour, the toluene solvent was removed by distillation under reduced pressure with heating at 40° C., so that a powdery catalyst was obtained.

(3) Production of Ethylene-1-Hexene Copolymer

Continuous gas-phase copolymerization of ethylene with 1-hexene was performed using the powdery catalyst obtained in the section (2). Specifically, the polymerization was performed at a constant temperature with a constant gas composition in a continuous gas-phase polymerization apparatus (inner volume 100 L, fluidized bed diameter 10 cm, fluidized bed seed polymer (dispersant) 1.8 kg) set at a temperature of 75° C., a hexene/ethylene molar ratio of 0.27%, a hydrogen/ethylene molar ratio of 0.53%, a nitrogen concentration of 26 mol %, and a total pressure of 0.8 MPa while the powdery catalyst was intermittently supplied at a rate of 0.21 g/hour to the polymerization apparatus. In order to keep the cleanliness in the system, a hexane-diluted solution of 0.03 mol/L triethylaluminum (TEA) was supplied at 15.7 ml/hr to the gas circulation line. As a result, polyethylene was produced at an average rate of 330 g/hr. After at least 5 kg of polyethylene was produced in total, an ethylene-1-hexene copolymer was obtained with a MFR, of 0.23 g/10 minutes and a density of 0.921 g/cm$^3$. The results are shown in Tables 3 and 4.

Example 2

(1) Synthesis of Olefin Polymerization Catalyst

Under a nitrogen atmosphere, 30 g of silica, which had been baked at 400° C. for 5 hours, was added to a 500-ml three-neck flask, to which 195 ml of dehydrated toluene was then added to form a slurry. Under a nitrogen atmosphere, 410 mg of dimethylsilylene(4-(4-trimethylsilyl-phenyl)-indenyl) (cyclopentadienyl)zirconium dichloride synthesized in Example 1 (1) was added to a 200-ml two-neck flask provided separately, and dissolved with 80.4 ml of dehydrated toluene. At room temperature, 82.8 ml of a 20% methylaluminoxane/toluene solution manufactured by Albemarle Corporation was then added to the resulting solution and stirred for 30 minutes. The whole amount of the toluene solution of the reaction product of the zirconocene complex with methylaluminoxane was added to a 500-ml three-neck flask containing the toluene slurry of silica, while the flask was heated with stirring in an oil bath at 40° C. After stirred at 40° C. for 1 hour, the mixture was gently subjected to precipitation with heating at 40° C. for 15 minutes. After 224 ml of the resulting supernatant was removed, the toluene solvent was removed by distillation under reduced pressure, so that a powdery catalyst was obtained.

(2) Production of Ethylene-1-Hexene Copolymer

Continuous gas-phase copolymerization of ethylene with 1-hexene was performed in the same manner as in Example 1 (3), except that the copolymerization was performed under the conditions shown in Table 2 using the powdery catalyst obtained in the section (1) instead of the powdery catalyst of Example 1 (2). The results are shown in Tables 3 and 4.

Example 3

(1) Synthesis of Olefin Polymerization Catalyst

Under a nitrogen atmosphere, 20 g of silica, which had been baked at 400° C. for 5 hours, was added to a 500-ml three-neck flask and then dried under reduced pressure for 1 hour using a vacuum pump while heated at 150° C. in an oil bath. Under a nitrogen atmosphere, 273 mg of dimethylsilylene(4-(4-trimethylsilyl-phenyl)-indenyl) (cyclopentadienyl)zirconium dichloride synthesized in the section (1) was added to a 200-ml two-neck flask provided separately, and dissolved with 53.6 ml of dehydrated toluene. At room temperature, 55.2 ml of a 20% methylaluminoxane/toluene solution manufactured by Albemarle Corporation was then added to the resulting solution and stirred for 30 minutes. The whole amount of the toluene solution of the reaction product of the zirconocene complex with methylaluminoxane was added to the 500-ml three-neck flask containing vacuum-dried silica, while the flask was heated with stirring in an oil bath at 40° C. After the mixture was stirred at 40° C. for 1 hour, the toluene solvent was removed by distillation under reduced pressure with heating at 40° C., so that a powdery catalyst was obtained.

(2) Production of Ethylene-1-Hexene Copolymer

Continuous gas-phase copolymerization of ethylene with 1-hexene was performed in the same manner as in Example 1 (3), except that the copolymerization was performed under the conditions shown in Table 2 using the powdery catalyst obtained in the section (1) instead of the powdery catalyst of Example 1 (2). The results are shown in Tables 3 and 4.

Example 4

Production of Ethylene-1-Hexene Copolymer

Continuous gas-phase copolymerization of ethylene with 1-hexene was performed in the same manner as in Example 1 (3), except that the copolymerization was performed under the conditions shown in Table 2 using the powdery catalyst obtained in Example 2 (2). The results are shown in Tables 3 and 4.

Example 5

Production of Ethylene-1-Hexene Copolymer

Continuous gas-phase copolymerization of ethylene with 1-hexene was performed in the same manner as in Example 1 (3), except that the copolymerization was performed under the conditions shown in Table 2 using the powdery catalyst obtained in Example 2 (2). The results are shown in Tables 3 and 4.

Example 6

(1) Synthesis of Olefin Polymerization Catalyst

Under a nitrogen atmosphere, 30 g of silica, which had been baked at 400° C. for 5 hours, was added to a 500-ml three-neck flask, to which 195 ml of dehydrated toluene was then added to form a slurry. Under a nitrogen atmosphere, 412 mg of dimethylsilylene(4-(4-trimethylsilyl-phenyl)-indenyl) (cyclopentadienyl)zirconium dichloride synthesized in Example 1 (1) was added to a. 200-ml two-neck flask provided separately, and dissolved with 80.7 ml of dehydrated toluene. At room temperature, 78.9 ml of a 20% methylaluminoxane/toluene solution manufactured by Albemarle Corporation was then added to the resulting solution and stirred for 30 minutes. The whole amount of the toluene solution of the reaction product of the zirconocene complex with methylaluminoxane was added to a 500-ml three-neck flask containing the toluene slurry of silica, while the flask was heated with stirring in an oil bath at 90° C. After stirred at 40° C. for 1 hour, the mixture was gently subjected to precipitation with heating at 40° C. for 15 minutes. After 221 ml of the resulting supernatant was removed, the toluene solvent was removed by distillation under reduced pressure, so that a powdery catalyst was obtained.

(2) Production of Ethylene-1-Hexene Copolymer

Continuous gas-phase copolymerization of ethylene with 1-hexene was performed in the same manner as in Example 1 (3), except that the copolymerization was performed under the conditions shown in Table 2 using the powdery catalyst obtained in the section (1) instead of the powdery catalyst of Example 1 (2). The results are shown in Tables 3 and 4.

Example 7

(1) Treatment of Olefin Polymerization Catalyst

Under a nitrogen atmosphere, 32 g part of the powdery catalyst obtained Example 6 (1) was added to a 500-ml three-neck flask, to which a liquid mixture of 195 ml of dehydrated hexane and 13.5 g of dehydrated liquid paraffin (MORESCO WHITE P-120 (trade name) manufactured by MORESCO Corporation.) Was added at room temperature. After the liquid mixture was stirred for 10 minutes, the solvent was removed by distillation under reduced pressure at 40° C., so that a powdery catalyst was obtained again.

(2) Production of Ethylene-1-Hexene Copolymer

Continuous gas-phase copolymerization of ethylene with 1-hexene was performed in the same manner as in Example 1 (3), except that the copolymerization was performed under the conditions shown in Table 2 using the powdery catalyst obtained in the section (1) instead of the powdery catalyst of Example 1 (2). The results are shown in Tables 3 and 4.

Example 8

(1) Treatment of Olefin Polymerization Catalyst

Under a nitrogen atmosphere, 31 g part of the powdery catalyst obtained Example 6 (1) was added to a 500-ml three-neck flask, to which a liquid mixture of 195 ml of dehydrated hexane and 12.7 g of dehydrated liquid polybutene (Nisseki Polybutene LV-7 (trade name) manufactured by JX Nippon Oil & Energy Corporation) was added at room temperature. After the mixture was stirred for 10 minutes, the solvent was removed by distillation under reduced pressure at 40° C., so that a powdery catalyst was obtained again.

(2) Production of Ethylene-1-Hexene Copolymer

Continuous gas-phase copolymerization of ethylene with 1-hexene was performed in the same manner as in Example 1 (3), except that the copolymerization was performed under the conditions shown in Table 2 using the powdery catalyst obtained in the section (1) instead of the powdery catalyst of Example 1 (2). The results are shown in Tables 3 and 4.

Example 9

(1) Synthesis of Olefin Polymerization Catalyst

Under a nitrogen atmosphere, 30 g of silica, which had been baked at 600° C. for 5 hours, was added to a 500-ml three-neck flask and then dried under reduced pressure for 1 hour using a vacuum pump while heated at 150° C. in an oil bath. Under a nitrogen atmosphere, 412 mg of dimethylsilylene(4-(4-trimethylsilyl-phenyl)-indenyl) (cyclopentadienyl)zirconium dichloride synthesized in the section (1) was added to a 200-ml two-neck flask provided separately, and dissolved with 80.7 ml of dehydrated toluene. At room temperature, 83.1 ml of a 20% methylaluminoxane/toluene solution manufactured by Albemarle Corporation was then added to the resulting solution and stirred for 30 minutes. The whole amount of the toluene solution of the reaction product of the zirconocene complex with methylaluminoxane was added to a 500-ml three-neck flask containing vacuum-dried silica, while the flask was heated with stirring in an oil bath at 90° C. After the mixture was stirred at 40° C. for 1 hour, the toluene solvent was removed by distillation under reduced pressure with heating at 40° C., so that a powdery catalyst was obtained.

(2) Production of Ethylene-1-Hexene Copolymer

Continuous gas-phase copolymerization of ethylene with 1-hexene was performed in the same manner as in Example 1 (3), except that the copolymerization was performed under the conditions shown in Table 2 using the powdery catalyst obtained in the section (1) instead of the powdery catalyst of Example 1 (2). The results are shown in Tables 3 and 4.

Example 10

(1) Synthesis of Olefin Polymerization Catalyst

A powdery catalyst for olefin polymerization was obtained in the same manner as in Example 1 (2), except that 421 mg of dimethylsilylene(3-methyl-4-(4-trimethylsilyl-phenyl)-3-methyl-indenyl) (cyclopentadienyl)zirconium dichloride was used instead of dimethylsilylene(4-(4-trimethylsilyl-phenyl)-indenyl) (cyclopentadienyl)zirconium dichloride.

(2) Production of Ethylene-1-Hexene Copolymer

Continuous gas-phase copolymerization of ethylene with 1-hexene was performed in the same manner as in Example 1 (3), except that the copolymerization was performed under the conditions shown in Table 2 using the powdery catalyst obtained in the section (1) instead of the powdery catalyst of Example 1 (2). The results are shown in Tables 3 and 4.

[Example 11] Production of Ethylene-1-Hexene Copolymer

Continuous gas-phase copolymerization of ethylene with 1-hexene was performed in the same manner as in Example 1 (3), except that the copolymerization was performed under the conditions shown in Table 2 using, instead of the powdery catalyst of Example 7 (2), a slurry catalyst obtained through changing the amount of the dehydrated liquid paraffin to 180 g in the process of Example 7 (1). The results are shown in Tables 3 and 4.

[Example 12] Production of Ethylene-1-Hexene Copolymer

Continuous gas-phase copolymerization of ethylene with 1-hexene was performed in the same manner as in Example 11, except that the copolymerization was performed under the conditions shown in Table 2. The results are shown in Tables 3 and 4.

[Example 13] Production of Ethylene-1-Hexene Copolymer

Continuous gas-phase copolymerization of ethylene with 1-hexene was performed in the same manner as in Example 12, except that the copolymerization was performed under the conditions shown in Table 2, the ethylene partial pressure was changed to 1.5 MPa namely about 3.1 times), and the TEA feed rate was changed to 0.05 mmol/hr. The results are shown in Tables 3 and 4.

Comparative Example 1

Production of Ethylene-1-Hexene Copolymer

Continuous gas-phase copolymerization of ethylene with 1-hexene was performed in the same manner as in the method for producing the ethylene polymer (B-8) described in Example 8a (1) of JP 2012-214781 A. The results are shown in Tables 3 and 4.

Comparative Example 2

(1) Synthesis of Olefin Polymerization Catalyst

Under a nitrogen atmosphere, 30 g of silica, which had been baked at 400° C. for 5 hours, was added to a 500-ml three-neck flask, to which 195 ml of dehydrated toluene was then added to form a slurry. Under a nitrogen atmosphere, 820 mg of dimethylsilylene(4-(4-trimethylsilyl-phenyl)-indenyl) (cyclopentadienyl)zirconium dichloride synthesized in Example 1 (1) was added to a 200-ml two-neck flask provided separately, and dissolved with 161 ml of dehydrated toluene. At room temperature, 49.7 ml of a 20% aluminoxane/toluene solution manufactured by Albemarle Corporation was then added to the resulting solution and stirred for 30 minutes. The whole amount or the toluene solution of the reaction product of the zirconocene complex with methylaluminoxane was added to a 500-ml three-neck flask containing the toluene slurry of silica, while the flask was heated with stirring in an oil bath at 40° C. After stirred at 40° C. for 1 hour, the mixture was gently subjected to precipitation heating at 40° C. for 15 minutes. After 224 ml of the resulting supernatant was removed, the toluene solvent was removed by distillation under reduced pressure, so that a powdery catalyst was obtained.

(2) Production of Ethylene-1-Hexene Copolymer

Continuous gas phase copolymerization of ethylene with 1-hexene was performed in the same manner as in Example 1 (3), except that the copolymerization was performed under the conditions shown in Table 2 using the powdery catalyst obtained in the section (1) instead of the powdery catalyst of Example 1 (2). The results are shown in Tables 3 and 4.

Comparative Example 3

Production of Ethylene-1-Hexene Copolymer

Continuous gas-phase copolymerization of ethylene with 1-hexene was performed in the same manner as in the method for producing the ethylene polymer (B-5) described in Example 5a (1) of JP 2012-214781 A. The results are shown in Tables 2 and 3.

Comparative Example 9

(1) Synthesis of Olefin Polymerization Catalyst

A powdery catalyst for olefin polymerization was obtained in the same manner as in Comparative Example 2 (1), except that 338 mg of dimethylsilylenebisindenylzirconium dichloride was used instead of 820 mg of dimethylsilylene(4-(4-trimethylsilyl-phenyl)-indenyl) (cyclopentadienyl)zirconium dichloride.

(2) Production of Ethylene-1-Hexene Copolymer

Continuous gas-phase copolymerization of ethylene with 1-hexene was performed in the same manner as in Example 1 (3), except that the copolymerization was performed under the conditions shown in Table 2 using the powdery catalyst obtained in the section (1) instead of the powdery catalyst of Example 1 (2). The results are shown in Tables 3 and 4.

Comparative Example 5

A commercially available ethylene polymer with long-chain branching (CU5001 manufactured by Sumitomo Chemical Co., Ltd., MFR=0.3 g/10 minutes, density 0.922 g/cm$^3$) was subjected to analysis. The results of the analysis are shown in Tables 3 and 4.

Reference Example 11

Commercially available high-pressure radical process low-density polyethylene (LF240 manufactured by Japan Polyethylene Corporation, MFR=0.7 g/10 minutes, density 0.924 g/cm$^3$) was subjected to analysis. The results of the analysis are shown in Tables 3 and 4.

Comparative Example 6

Production of Linear Low-Density Polyethylene (Ethylene-1-Hexene Copolymer) With no Long-Chain Branching As an example of production of common linear low-density polyethylene with no long-chain branching, continuous gas-phase copolymerization of ethylene with 1-hexene was performed in the same manner as in the method for producing the ethylene polymer (A-1) described in Example 1a (1) of JP 2012-214781 A, except that the polymerization was performed under the conditions shown in Table 1 using metallocene 4, shown in Table 2, as the metallocene compound. The results are shown in Tables 3 and 4.

[Film Forming Experiment]

A film forming experiment was performed as described below to demonstrate now the ethylene-α-olefin copolymer of the present invention is effective in modifying polyolefin resins.

How the ethylene-α-olefin copolymer of the present invention has high performance as a modifier for polyolefin resin can be demonstrated by measuring the physical properties of films that are obtained by blending a certain amount of a copolymer according to the present invention and a certain amount of a copolymer not according to the present invention, respectively, with a commercially available ethylene polymer and then subjecting the resulting polyolefin resin compositions, respectively, to blown film molding.

Specifically, the copolymers of Examples 1 to 13, comparative Examples 1 to 6, and Reference Example 1 were blended, respectively, with a commercially available ethylene polymer (UF230 manufactured by Japan Polyethylene Corporation, MFR=1.1 g/10 minutes, density 0.921 g/cm$^3$, an ethylene-1-butene copolymer) produced with a magnesium titanium Ziegler catalyst, and then the resulting compositions were formed into films by blown film molding. Table 4 shows the blend ratio between the commercially available ethylene polymer and the copolymer according to or not according to the present invention, the tensile modulus (in units of MPa) and dart drop impact strength (DDI in units of g) of the resulting films.

TABLE 2

| Examples | Olefin polymerization catalyst | | | | | | Polymerization conditions | | | | | |
|---|---|---|---|---|---|---|---|---|---|---|---|---|
| | Component (A) | Component (B) | Component (C) | Zr/Silica μmol/g | MAO/Silica mmol/g | MAO/Zr mol/mol | Polymerization temperature °C | H2/C2 % | C6/C2 % | Average residence time hr | Production rate g/hr | Activity g/g/hr/MPa |
| Example 1 | Metallocene 1 | MAO | Silica | 25 | 8.0 | 320 | 75 | 0.53 | 0.27 | 5.5 | 330 | 497 |
| Example 2 | Metallocene 1 | MAO | Silica | 25 | 8.0 | 320 | 75 | 0.67 | 0.28 | 6.5 | 275 | 481 |
| Example 3 | Metallocene 1 | MAO | Silica | 25 | 8.0 | 321 | 75 | 0.53 | 0.25 | 5.0 | 363 | 395 |
| Example 4 | Metallocene 1 | MAO | Silica | 25 | 8.0 | 320 | 75 | 0.72 | 0.24 | 4.9 | 370 | 727 |
| Example 5 | Metallocene 1 | MAO | Silica | 25 | 8.0 | 320 | 75 | 0.64 | 0.30 | 6.8 | 265 | 264 |
| Example 6 | Metallocene 1 | MAO | Silica | 25 | 7.6 | 303 | 75 | 0.69 | 0.26 | 4.2 | 425 | 512 |
| Example 7 | Metallocene 1 | MAO | Silica | 25 | 7.6 | 303 | 75 | 0.72 | 0.25 | 5.5 | 330 | 279 |
| Example 8 | Metallocene 1 | MAO | Silica | 25 | 7.6 | 303 | 75 | 0.71 | 0.24 | 6.2 | 289 | 294 |
| Example 9 | Metallocene 1 | MAO | Silica | 25 | 8.0 | 320 | 75 | 0.49 | 0.40 | 5.2 | 345 | 369 |
| Example 10 | Metallocene5 | MAO | Silica | 25 | 8.0 | 320 | 75 | 0.41 | 1.52 | 5.8 | 311 | 482 |
| Example 11 | Metallocene 1 | MAO | Silica | 25 | 8.0 | 320 | 75 | 0.46 | 0.44 | 10.3 | 175 | 72 |
| Example 12 | Metallocene 1 | MAO | Silica | 25 | 8.0 | 320 | 80 | 0.46 | 0.39 | 5.9 | 305 | 304 |
| Example 13 | Metallocene 1 | MAO | Silica | 25 | 8.0 | 320 | 85 | 0.40 | 0.39 | 9.3 | 195 | 241 |
| Comparative 1 | Metallocene 1 | MAO | Silica | 25 | 5.0 | 200 | 75 | 0.55 | 0.40 | 6.3 | 288 | 135 |
| Comparative 2 | Metallocene 1 | MAO | Silica | 50 | 4.8 | 96 | 75 | 0.29 | 0.46 | 5.3 | 338 | 195 |
| Comparative 3 | Metallocene 2 | MAO | Silica | 30 | 4.1 | 136 | 80 | 0.05 | 1.98 | 6.9 | 260 | 320 |
| Comparative 4 | Metallocene 3 | MAO | Silica | 25 | 5.0 | 200 | 75 | 0.38 | 0.54 | 5.0 | 360 | 414 |
| Comparative 5 | Commercially available ethylene copolymer with long-chain branching | | | | | | | | | | | |
| Reference 1 | Commercially available high-pressure radical process low-density polyethylene with long-chain branching | | | | | | | | | | | |
| Comparative 6 | Metallocene 4 | MAO | Silica | 41 | 4.0 | 99 | 80 | 0.01 | 1.82 | 6.9 | 262 | 312 |

Metallocene 1: Dimethylsilylene(4-(4-trimethylsilyl-phenyl)-indenyl)(cyclopentadienyl)zirconium dichloride
Metallocene 2: A mixture of trisindenylzirconium hydride and trisbenzoindenylzirconium hydride
Metallocene 3: Dimethylsilylenebisindenylzirconium dichloride
Metallocene 4: A product of contact reaction of tetraethoxyzirconium, indene, methylbutylcyclopentadiene, and tripropylaluminum
Metallocene 5: Dimethylsilylene(3-methyl-4-(4-trimethylsilyl-phenyl)-indenyl)(cyclopentadienyl)zirconium dicholoride

TABLE 3

Results of analysis of ethylene-α-olefin copolymer

| Examples | MFR | | Density | | GPC | | | GPC-VIS | | | TREF | |
|---|---|---|---|---|---|---|---|---|---|---|---|---|
| | (g/10 min) | Condition (1) satisfied or not | (g/cm3) | Condition (2) satisfied or not | Mw/Mn | Condition (3) satisfied or not | Mz/Mw | $g_c'$ | Condition (5) satisfied or not | | X (%) | Condition (6) satisfied or not |
| Example 1 | 0.23 | ○ | 0.921 | ○ | 3.4 | ○ | 2.4 | 0.71 | ○ | | 9 | ○ |
| Example 2 | 0.13 | ○ | 0.919 | ○ | 3.9 | ○ | 2.6 | 0.72 | ○ | | 8 | ○ |
| Example 3 | 0.34 | ○ | 0.919 | ○ | 4.1 | ○ | 2.6 | 0.51 | ○ | | 7 | ○ |
| Example 4 | 0.21 | ○ | 0.920 | ○ | 3.9 | ○ | 2.5 | 0.74 | ○ | | 12 | ○ |
| Example 5 | 0.30 | ○ | 0.921 | ○ | 4.3 | ○ | 2.6 | 0.67 | ○ | | 14 | ○ |
| Example 6 | 0.35 | ○ | 0.918 | ○ | 4.9 | ○ | 3.1 | 0.64 | ○ | | 12 | ○ |
| Example 7 | 0.22 | ○ | 0.922 | ○ | 4.8 | ○ | 3.2 | 0.66 | ○ | | 13 | ○ |
| Example 8 | 0.25 | ○ | 0.922 | ○ | 4.7 | ○ | 2.8 | 0.68 | ○ | | 13 | ○ |
| Example 9 | 0.24 | ○ | 0.917 | ○ | 4.5 | ○ | 2.6 | 0.66 | ○ | | 9 | ○ |
| Example 10 | 0.15 | ○ | 0.918 | ○ | 4.9 | ○ | 2.9 | 0.50 | ○ | | 7 | ○ |
| Example 11 | 0.33 | ○ | 0.916 | ○ | 4.5 | ○ | 2.7 | 0.60 | ○ | | 15 | ○ |
| Example 12 | 0.26 | ○ | 0.918 | ○ | 6.9 | ○ | 2.6 | 0.49 | ○ | | 13 | ○ |
| Example 13 | 0.38 | ○ | 0.920 | ○ | 6.3 | X | 3.8 | 0.45 | ○ | | 15 | ○ |
| Comparative 1 | 0.21 | ○ | 0.920 | ○ | 5.1 | ○ | 2.8 | 0.63 | ○ | | 13 | ○ |
| Comparative 2 | 0.25 | ○ | 0.921 | ○ | 4.7 | ○ | 3.5 | 0.55 | ○ | | 24 | X |
| Comparative 3 | 0.30 | ○ | 0.922 | ○ | 3.9 | ○ | 5.0 | 0.60 | ○ | | 36 | X |
| Comparative 4 | 0.24 | ○ | 0.915 | ○ | 5.1 | ○ | 2.5 | 0.57 | ○ | | 7 | ○ |
| Comparative 5 | 0.30 | ○ | 0.922 | ○ | 7.2 | X | 3.6 | 0.48 | ○ | | 9 | ○ |
| Reference 1 | 0.70 | ○ | 0.924 | ○ | 5.5 | ○ | 3.1 | 0.26 | X | | 1 | X |
| Comparative 6 | 0.90 | ○ | 0.920 | ○ | 2.9 | ○ | 1.9 | 0.91 | X | | 35 | X |

Results of analysis of ethylene-α-olefin copolymer

| Examples | log Mw | 50% elution temperature (°C.) | W1 (%) | W2 (%) | W3 (%) | W4 (%) | W2 + W3 | Condition (7) satisfied or not | W2 + W4 | Condition (8) satisfied or not | W2 − W4 | Condition (9) satisfied or not |
|---|---|---|---|---|---|---|---|---|---|---|---|---|
| | | | | | | | CFC (%) | | | | | |
| Example 1 | 4.8 | 76 | 37 | 23 | 23 | 17 | 46 | ○ | 41 | ○ | 6 | ○ |
| Example 2 | 4.9 | 74 | 35 | 24 | 28 | 13 | 52 | ○ | 37 | ○ | 11 | ○ |
| Example 3 | 4.8 | 70 | 34 | 21 | 27 | 18 | 48 | ○ | 39 | ○ | 4 | ○ |
| Example 4 | 4.9 | 76 | 37 | 23 | 29 | 12 | 52 | ○ | 35 | ○ | 11 | ○ |
| Example 5 | 4.9 | 72 | 32 | 20 | 35 | 13 | 55 | ○ | 33 | ○ | 8 | ○ |
| Example 6 | 4.9 | 72 | 38 | 22 | 31 | 10 | 53 | ○ | 31 | ○ | 12 | ○ |

TABLE 3-continued

| | | | | | | | | | | | | | |
|---|---|---|---|---|---|---|---|---|---|---|---|---|---|
| Example 7 | 4.8 | 74 | 34 | 14 | 28 | 13 | 53 | ○ | 38 | ○ | 11 | ○ |
| Example 8 | 4.9 | 76 | 38 | 21 | 31 | 10 | 52 | ○ | 31 | ○ | 11 | ○ |
| Example 9 | 4.9 | 70 | 35 | 18 | 31 | 16 | 49 | ○ | 34 | ○ | 3 | ○ |
| Example 10 | 4.9 | 71 | 37 | 20 | 29 | 15 | 48 | ○ | 34 | ○ | 5 | ○ |
| Example 11 | 4.8 | 68 | 35 | 21 | 30 | 15 | 50 | ○ | 35 | ○ | 6 | ○ |
| Example 12 | 4.8 | 70 | 35 | 18 | 32 | 15 | 50 | ○ | 34 | ○ | 3 | ○ |
| Example 13 | 5.0 | 72 | 39 | 14 | 32 | 15 | 47 | ○ | 29 | ○ | 0 | ○ |
| Comparative 1 | 4.9 | 68 | 33 | 21 | 34 | 12 | 56 | X | 33 | ○ | 10 | ○ |
| Comparative 2 | 4.9 | 72 | 33 | 23 | 34 | 10 | 57 | X | 33 | ○ | 12 | ○ |
| Comparative 3 | 5.0 | 76 | 35 | 15 | 40 | 10 | 56 | X | 25 | X | 5 | ○ |
| Comparative 4 | 4.9 | 66 | 33 | 18 | 31 | 18 | 49 | ○ | 36 | ○ | 0 | X |
| Comparative 5 | 4.9 | 72 | 44 | 15 | 25 | 15 | 41 | ○ | 31 | ○ | 0 | X |
| Reference 1 | 4.9 | 74 | 45 | 14 | 22 | 19 | 36 | X | 33 | ○ | −4 | X |
| Comparative 6 | 5.0 | 78 | 33 | 22 | 30 | 16 | 51 | ○ | 37 | ○ | 6 | ○ |

TABLE 4

| Film forming experiment | | | Run 1 | Run 2 | Run 3 | Run 4 | Run 5 | Run 6 | Run 7 | Run 8 | Run 9 | Run 10 | Run 11 |
|---|---|---|---|---|---|---|---|---|---|---|---|---|---|
| Modifier | Polymer type | | Ex. 1 | Ex. 2 | Ex. 3 | Ex. 4 | Ex. 5 | Ex. 6 | Ex. 7 | | Ex. 8 | Ex. 9 | |
| | Blend ratio | Wt % | 20 | 10 | 10 | 20 | 10 | 20 | 20 | 30 | 10 | 5 | 10 |
| Material to be modified | Polyolefin resin | | PE-3: UF230, MFR 1.1 g/10 minutes, density 0.921 g/cm3 | | | | | | | | | | |
| | Blend ratio | Wt % | 80 | 90 | 90 | 80 | 90 | 80 | 80 | 70 | 90 | 95 | 90 |
| Blown film | Elastic modulus (MD direction) | MPa | 248 | 241 | 250 | 260 | 248 | 250 | 253 | 241 | 240 | 255 | 245 |
| | DDI impact strength | g | 154 | 139 | 133 | 145 | 135 | 151 | 149 | 163 | 147 | 129 | 145 |

| Film forming experiment | | | Run 12 | Run 13 | Run 14 | Run 15 | Run 16 | Run 17 | Run 18 | Run 19 | Run 20 | Run 21 | Run 22 |
|---|---|---|---|---|---|---|---|---|---|---|---|---|---|
| Modifier | Polymer type | | Comparative 1 | | Comparative 2 | Comparative 3 | Comparative 4 | Comparative 5 | | | Reference 1 | | |
| | Blend Ratio | Wt % | 20 | 10 | 20 | 20 | 20 | 5 | 10 | 20 | 0 | 10 | 15 |
| Material to be modified | Polyolefin resin | | PE-3: UF230, MFR 1.1 g/10 minutes, density 0.921 g/cm3 | | | | | | | | | | |
| | Blend ratio | Wt % | 80 | 90 | 80 | 80 | 80 | 95 | 90 | 80 | 100 | 90 | 85 |
| Blown film | Elastic modulus (MD direction) | MPa | 245 | 245 | 254 | 250 | 237 | 255 | 250 | 272 | 240 | 270 | 314 |
| | DDI impact strength | g | 144 | 129 | 132 | 138 | 142 | 119 | 125 | 115 | 113 | 104 | 96 |

| Film forming experiment | | | Run 23 | Run 24 | Run 25 | Run 26 |
|---|---|---|---|---|---|---|
| Modifier | Polymer type | | Ex. 11 | Ex. 12 | Ex. 13 | Comparative 6 |
| | Blend ratio | Wt % | 20 | 20 | 20 | 20 |
| Material to be modified | Polyolefin resin | | PE-3: UF230, MFR 1.1 g/10 minutes, density 0.921 g/cm3 | | | |
| | Blend ratio | Wt % | 80 | 80 | 80 | 80 |
| Blown film | Elastic modulus (MD direction) | MPa | 300 | 305 | 320 | 420 |
| | DDI impact strength | g | 150 | 145 | 140 | 90 |

(Discussion on the Results in Tables 2 to 4)

In Table 4, Runs 1, 4, 6, 7, 12, 14, and 23 to 25 allows a comparison between the physical properties of films each produced with a blend of an ethylene polymer PE-3 with 20% of the copolymer (as a modifier) of one of Examples 1 to 13 according to the present invention (among the ethylene-α-olefin copolymers in Table 3 produced using the catalysts and the polymerization conditions shown in Table 2) and the physical properties of films each produced with a blend of PE-3 with the copolymer of one of Comparative Examples 1 and 2, in which $W_2+W_3$ did not satisfy condition (7) because the ratio between the catalyst components (A), (B), and (C) used in these comparative examples differed from that in these examples although the same catalyst components were used in these examples and comparative examples. FIG. 6 shows a graph obtained by plotting the elastic modulus and the impact strength obtained in each run with a copolymer blend ratio of 5, 10, or 20%.

The balance between the tensile modulus and impact strength of the film is significantly better in Runs 1, 4, 6, 7, and 23 to 25 than in Runs 12 and 14, which will show the superiority of the modifier according to the present invention. The balance between the tensile modulus and impact strength of films produced using a blend with a smaller amount (10%) of the copolymer of the example according to the present invention is also better than that in Run 13 using the same amount of the copolymer of Comparative Example 1. Despite the smaller blended amount (10%), these films have substantially the same level of performance as that of Run 12 or 14 using a larger amount (20%) of the copolymer of Comparative Example 1 or 2. This also shows the superiority of the copolymer of the present invention.

In each of Comparative Examples 3, 4, and 6, a copolymer not according to the present invention was prepared using another catalyst component (A), and in Comparative Example 5, a commercially available ethylene-α-olefin copolymer was provided, which has long-chain branching but is not according to the present invention. Each of these copolymers was blended as a modifier in an amount of 10% or 20% with the ethylene polymer PE-3, and the resulting blends were used to form films (Runs 15 to 19 and 26). The copolymers of these comparative examples only produced at most the same level of modification effect as the copolymer of Comparative Example 1. The copolymers of these comparative examples slightly improved the balance between the tensile modulus and the impact strength of the ethylene polymer PE-3 before the modification, but produced almost no increase in the impact strength even when ended in a larger amount, in contract to the polymers of the examples according to the present invention. This will show that all other copolymers are inferior to the copolymer of the present invention.

Next, the usefulness of the copolymer of the present invention as a modifier will be shown by a comparison between the physical properties of a film produced using a blend of the ethylene polymer PE-3 with the copolymer of the present invention and the physical properties of a film produced using a blend of PE-3 with high-pressure radical process polyethylene as a modifier, which is well known as a practical measure for improving the blown film molding properties of PE-3.

Specifically, in Runs 20 to 22, films were formed using blends of the ethylene polymer PE-3 with 0%, 10%, and 15% of commercially available high-pressure process polyethylene. The film molding properties of the blend with 15% of high-pressure process polyethylene in Run 25 was substantially the same level (substantially the same level of melt tension) as that of the blends with 20 to 30% of the copolymer of the present invention in Runs 1, 4, and 6 to 8. However, as regards the tensile modulus and impact strength of the film, the impact strength of the film in Run 25 was lower than that of the film of the ethylene polymer PE-3 alone in Run 23 although the tensile modulus of the film in Run 25 was higher than that of the film of the ethylene polymer PE-3 alone in Run 23. In Run 25, the impact strength was not significantly improved in contrast to the case using the copolymer of the present invention. Therefore, the copolymer of the present invention makes it possible to provide an excellent technique for producing ethylene-based films that are not available with conventional modification techniques.

Example 10 shows that even when another bridged cyclopentadienyl indenyl compound different from that in Example 1 is used as the catalyst component (A), the ethylene-1-hexene copolymer according to the present invention can be produced using an increased amount of the catalyst component (B) relative to the amount of the catalyst component (C).

The above shows the rational and significance of the elements of the present invention and the superiority of the present invention to the conventional art.

INDUSTRIAL APPLICABILITY

As is apparent from the above, the ethylene-α-olefin copolymer of the present invention is highly effective, as a modifier for polyolefin resin, in improving molding properties, improving the balance between impact strength and stiffness, and improving transparency. Therefore, the ethylene-α-olefin copolymer of the present invention makes it possible to provide thinner molded products in an economically advantageous manner.

Therefore, the ethylene-α-olefin copolymer of the present invention, which makes it possible to provide molded products with such favorable properties in an economically advantageous manner, is of extremely high industrial value.

The invention claimed is:

1. An ethylene-α-olefin copolymer satisfying the following conditions (1), (2), (5), (7), and (9):
   (1) the copolymer has a MFR of more than 0.1 g/10 minutes but not more than 10 g/10 minutes;
   (2) the copolymer has a density of 0.895 to 0.940 g/cm$^3$;
   (5) the copolymer has a minimum branching index (gc) of 0.40 to 0.85 as measured for branching index g' in the molecular weight range of 100,000 to 1,000,000 with a GPC measurement system comprising a combination of a differential refractometer, a viscosity detector, and a light scattering detector;
   (7) the copolymer has a sum ($W_2$+$W_3$) of a content ($W_2$) and a content ($W_3$) of more than 40% by weight but less than 56% by weight, wherein $W_2$ is a content of components with molecular weights equal to or more than a weight average molecular weight in components eluted at temperatures equal to or lower than a temperature where an eluted amount determined from an integral elution curve measured by cross fractionation chromatography (CFC) is 50 wt %, and $W_3$ is a content of components with molecular weights less than the weight average molecular weight in components eluted at temperatures higher than the temperature where the eluted amount determined from the integral elution curve is 50 wt %; and
   (9) the copolymer has a difference ($W_2$− $W_4$) between $W_2$ and $W_4$ of more than 0% by weight but less than 20% by weight, wherein $W_4$ is an content of components with molecular weights equal to or more than the weight average molecular weight in components eluted at temperatures higher than the temperature where the eluted amount determined from the integral elution curve measured by CFC is 50 wt %;
   wherein MFR is measured under the conditions of 190° C. and a load of 21.18 N (2.16 kg).

2. The ethylene-α-olefin copolymer according to claim 1, further satisfying the following condition (1'):
   (1') the copolymer has a MFR of more than 0.1 g/10 minutes but not more than 1.0 g/10 minutes.

3. The ethylene-α-olefin copolymer according to claim 1, further satisfying the following condition (2'):
   (2') the copolymer has a density of not less than 0.898 g/cm$^3$ but less than 0.934 g/cm$^3$.

4. The ethylene-α-olefin copolymer according to claim 1, wherein the α-olefin has three to ten carbon atoms.

5. The ethylene-α-olefin copolymer according to claim 1, further satisfying the following condition (3):
   (3) the copolymer has a molecular weight distribution Mw/Mn of 3.0 to 5.5 as measured by gel permeation chromatography (GPC).

6. The ethylene-α-olefin copolymer according to claim 1, further satisfying the following condition (4):
   (4) the copolymer has a molecular weight distribution Mz/Mw of 2.0 to 6.0 as measured by GPC.

7. The ethylene-α-olefin copolymer according to claim 1, further satisfying the following condition (6):
   (6) a content (X) of components eluted at 85° C. or higher by temperature rising elution fractionation (TREF) is 2 to 15% by weight.

8. The ethylene-α-olefin copolymer according to claim 1, further satisfying the following condition (8):
   (8) the copolymer has a sum ($W_2$+$W_4$) of $W_2$ and $W_4$ of more than 25% by weight but less than 50% by weight.

9. A method for producing the ethylene-α-olefin copolymer according to claim 1, the method comprising producing the ethylene-α-olefin copolymer using an olefin polymerization catalyst comprising the following components (A), (B) and (C):

(A) a bridged cyclopentadienyl indenyl compound containing a transition metal element;

(B) a compound capable of reacting with the compound of the component (A) to form a cationic metallocene compound; and (C) an inorganic compound carrier.

10. The ethylene-α-olefin copolymer according to claim 9, wherein a ratio of number of moles of a metal in the component (B) to 1 g of the component (C) is more than 0.006 (moles/g) to 0.020 (moles/g).

11. A method for producing the ethylene-α-olefin copolymer according to claim 1, the method comprising copolymerizing ethylene and an α-olefin by a gas phase method or a slurry method.

12. An olefin resin composition comprising: the ethylene-α-olefin copolymer (A) according to claim 1; and one or more other olefin resins.

13. The olefin resin composition according to claim 12, wherein an amount of the ethylene-α-olefin copolymer (A) contained in the resin composition is 1 to 59% by weight.

14. The olefin resin composition according to claim 12, which comprises an additional ethylene-α-olefin copolymer (B) other than the copolymer (A) as an olefin resin other than the copolymer (A).

15. The olefin resin composition according to claim 14, wherein the ethylene-α-olefin copolymer (B) satisfies the following conditions (B-1) and (B-2):

(B-1) the copolymer (B) has a MFR of 0.01 to 20 g/10 minutes; and (B-2) the copolymer (B) has a density of 0.880 to 0.970 g/cm$^3$.

16. The olefin resin composition according to claim 15, wherein the ethylene-α-olefin copolymer (B) further satisfies the following condition (B-3):

(B-3) the copolymer (B) has a molecular weight distribution Mw/Mn of 2.0 to 4.0 as measured by gel permeation chromatography (GPC).

17. The olefin resin composition according to claim 12, wherein the ethylene-α-olefin copolymer (A) and the ethylene-α-olefin copolymer (B) satisfy at least one of the following conditions:

(AB-1) MFR$_B$>MFR$_A$; and (AB-2) [Mw/Mn]$_B$<[Mw/Mn]$_A$, wherein MFR$_A$ represents MFR of the ethylene-α-olefin copolymer (A), [Mw/Mn]$_A$ represents the molecular weight distribution Mw/Mn of the ethylene-α-olefin copolymer (A) measured by gel permeation chromatography (GPC), MFR$_B$ represents MFR of the ethylene-α-olefin copolymer (B), and [Mw/Mn]$_B$ represents the molecular weight distribution Mw/Mn of the ethylene-α-olefin copolymer (B) measured by gel permeation chromatography (GPC).

18. The olefin resin composition according to claim 12, wherein the ethylene-α-olefin copolymer (B) is a linear low-density polyethylene having a MFR of not less than 0.1 but less than 5.0 and produced with a Ziegler catalyst or metallocene polyethylene having a MFR of not less than 0.1 to but not more than 10 and produced with a metallocene catalyst.

19. A film obtained from the ethylene-α-copolymer according to claim 1.

* * * * *